US012565909B2

(12) United States Patent
Zhang et al.

(10) Patent No.: US 12,565,909 B2
(45) Date of Patent: Mar. 3, 2026

(54) HINGE ASSEMBLY AND TERMINAL PRODUCT

(71) Applicant: HONOR DEVICE CO., LTD., Shenzhen (CN)

(72) Inventors: Handong Zhang, Shenzhen (CN); Yameng Wei, Shenzhen (CN); Lei Feng, Shenzhen (CN); Yaolei Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 190 days.

(21) Appl. No.: 18/567,497

(22) PCT Filed: Apr. 14, 2023

(86) PCT No.: PCT/CN2023/088460
§ 371 (c)(1),
(2) Date: Dec. 6, 2023

(87) PCT Pub. No.: WO2023/221705
PCT Pub. Date: Nov. 23, 2023

(65) Prior Publication Data
US 2024/0271656 A1 Aug. 15, 2024

(30) Foreign Application Priority Data

May 19, 2022 (CN) .......................... 202210563241.1

(51) Int. Cl.
| | |
|---|---|
| *E05D 3/06* | (2006.01) |
| *F16C 11/04* | (2006.01) |
| *H04M 1/02* | (2006.01) |

(52) U.S. Cl.
CPC ........... *F16C 11/04* (2013.01); *H04M 1/0222* (2013.01); *H04M 1/0237* (2013.01); *F16C 2380/00* (2013.01)

(58) Field of Classification Search
CPC ........ G06F 1/16; G06F 1/1616; G06F 1/1681; G06F 1/166; G06F 1/1679; G06F 1/1083;
(Continued)

(56) References Cited

U.S. PATENT DOCUMENTS

| | | | | | |
|---|---|---|---|---|---|
| 3,422,487 | A | * | 1/1969 | Dickinson | ................. E05D 3/06 |
| | | | | | 296/35.1 |
| 10,480,227 | B1 | * | 11/2019 | Chen | ....................... E05D 3/122 |

(Continued)

FOREIGN PATENT DOCUMENTS

| | | |
|---|---|---|
| CN | 210670152 U | 6/2020 |
| CN | 211693199 U | 10/2020 |

(Continued)

*Primary Examiner* — Chuck Y Mah

(57) ABSTRACT

A hinge assembly is provided. The first swing arm includes a first hinge connecting part and a first rotating part. The first swing arm is rotatable relative to the base around a first axis between the first hinge connecting part and the first rotating part. The second swing arm includes a second hinge connecting part and a second rotating part. The second swing arm is rotatable relative to the base around a second axis between the second hinge connecting part and the second rotating part. The second axis is parallel to the first axis. The slider includes a first fastening part, a second fastening part, and an extension part. The extension part is located in the guide groove. The first fastening part is movably connected to the first hinge connecting part. The second fastening part is movably connected to the second hinge connecting part.

19 Claims, 18 Drawing Sheets

(58) Field of Classification Search
CPC .. H04M 1/022; H04M 1/0214; H04M 1/0216;
H04M 1/0222; H04M 1/0231; H04M
1/04; H05K 5/0226; F16C 11/04; F16C
2380/00; F16M 11/10; E05D 11/105;
E05D 11/1021; E05D 11/1078; E05D
11/082; E05D 3/14; E05D 3/18; E05D
3/122; E05D 3/12; E05D 3/16; E05D
3/06; E05D 3/32; E05D 15/28; E05D
15/30; E05D 15/32; E05D 15/40; E05D
1/04; E05D 2001/045; E05Y 2900/606
See application file for complete search history.

(56) References Cited

U.S. PATENT DOCUMENTS

| | | | |
|---|---|---|---|
| 11,372,453 B2 | 6/2022 | Yu et al. | |
| 11,408,214 B1* | 8/2022 | Hsu | H04M 1/022 |
| 11,459,809 B1* | 10/2022 | Hsu | E05D 3/122 |
| 11,596,074 B2* | 2/2023 | Park | G06F 1/1652 |
| 2002/0038493 A1* | 4/2002 | Ko | H04N 23/50 |
| | | | 348/E5.025 |
| 2017/0183895 A1* | 6/2017 | Chen | E05D 11/082 |
| 2018/0230726 A1* | 8/2018 | Chen | E05D 5/04 |
| 2018/0329462 A1* | 11/2018 | Larsen | G06F 1/1681 |
| 2018/0363341 A1 | 12/2018 | Siddiqui et al. | |
| 2020/0363843 A1* | 11/2020 | Cheng | G06F 1/1681 |
| 2020/0392983 A1* | 12/2020 | Chang | F16C 11/04 |
| 2021/0165466 A1 | 6/2021 | Kang et al. | |
| 2021/0208641 A1 | 7/2021 | Huang et al. | |
| 2024/0241552 A1* | 7/2024 | Zhang | G06F 1/16 |

FOREIGN PATENT DOCUMENTS

| | | | | |
|---|---|---|---|---|
| CN | 112911033 A | 6/2021 | | |
| CN | 110138916 B | 10/2021 | | |
| CN | 113719525 A | * 11/2021 | | F16C 11/12 |
| CN | 113898665 A | 1/2022 | | |
| CN | 113993325 A | 1/2022 | | |
| CN | 114017436 A | 2/2022 | | |
| CN | 114076144 A | 2/2022 | | |
| CN | 114321145 A | 4/2022 | | |
| CN | 115059681 A | 9/2022 | | |
| TW | I626528 B | * 6/2018 | | G06F 1/1681 |

* cited by examiner

300'

310'                    310'

100a

HINGE ASSEMBLY AND TERMINAL PRODUCT

CROSS-REFERENCE TO RELATED APPLICATIONS

This application is a national stage of International Application No. PCT/CN2023/088460, filed on Apr. 14, 2023, which claims priority to Chinese Patent application Ser. No. 202210563241.1, filed on May 19, 2022. The disclosures of both of the aforementioned applications are hereby incorporated by reference in their entireties.

TECHNICAL FIELD

This application relates to the field of mechanical structures, and in particular to a hinge assembly and a terminal product.

BACKGROUND

A foldable mobile phone needs to maintain synchronous rotation of a screen on both sides during folding and unfolding. If the screen does not rotate synchronously on both sides during folding and unfolding, the screen is tilted relatively. Refer to FIG. 1. In an existing foldable mobile phone, four gears 300' are usually used to mesh with each other to implement synchronous rotation of the screen on both sides.

Due to limited space of the foldable mobile phone, a size of a hinge assembly is relatively small, and the gear 300' is usually a non-standard gear, with high processing costs. When the foldable mobile phone is folded and unfolded, an abnormal noise caused by meshing of the gears 300' exists. The gear 300' includes a plurality of teeth 310'. When the foldable mobile phone is subject to an external force (such as falling or collision), a problem that a tooth 310' is broken exists.

SUMMARY

According to a first aspect, this application provides a hinge assembly. The hinge assembly includes a base, a first swing arm, a second swing arm, and a slider. The base is provided with a guide groove. The first swing arm includes a first hinge connecting part and a first rotating part that are firmly connected. The first hinge connecting part and the first rotating part are rotatable relative to the base around a first axis between the first hinge connecting part and the first rotating part. The first axis is fastened relative to the base. The second swing arm includes a second hinge connecting part and a second rotating part that are firmly connected. The second hinge connecting part and the second rotating part are rotatable relative to the base around a second axis between the second hinge connecting part and the second rotating part. The second axis is fastened relative to the base. The second axis is parallel to the first axis. The slider includes a first fastening part, a second fastening part, and an extension part that are firmly connected. The extension part is located in the guide groove. The first fastening part is movably connected to the first hinge connecting part. The second fastening part is movably connected to the second hinge connecting part. The first axis and the second axis are parallel to a first direction. The extension part is movable in the guide groove in a second direction intersecting with the first direction, to drive the first swing arm and the second swing arm to rotate synchronously.

In the foregoing design, movement of the slider is limited to be in the second direction by using the guide groove, and the first swing arm and the second swing arm connected to the slider synchronously rotate along respective axes with the movement of the slider. The hinge assembly structure replaces a component with a gear used as a hinge assembly in a conventional technology, fundamentally preventing problems such as high costs caused by processing of non-standard gears, an abnormal noise caused by meshing rotation of the gears, and breaking of a tooth.

In a possible implementation, the first fastening part is provided with a first slide rail, and the second fastening part is provided with a second slide rail. The hinge assembly further includes a first pin and a second pin. The first pin penetrates the first slide rail and the first hinge connecting part. The second pin penetrates the second slide rail and the second hinge connecting part.

In the foregoing design, when the first slide rail and the second slide rail are disposed, during rotation of the first pin and the second pin, a relative distance between the first hinge connecting part and the second hinge connecting part changes, and a relative distance between the first pin and the second pin respectively connected to the first hinge connecting part and the second hinge connecting part changes. By disposing the first slide rail and the second slide rail, space for movement is provided for the first pin and the second pin.

In a possible implementation, a size of the first slide rail in a third direction is greater than a size of the first pin in the third direction. A size of the second slide rail in the third direction is greater than a size of the second pin in the third direction. The third direction is perpendicular to the first direction and the second direction.

In the foregoing design, size design is a specific implementation in which the first pin and the second pin can move relative to the slider.

In a possible implementation, the hinge assembly further includes a first elastic member. The first elastic member includes a first elastic part and a second elastic part connected to each other. An end, away from the second elastic part, of the first elastic part, is connected to the first hinge connecting part. One end, away from the first elastic part, of the second elastic part, is connected to the second hinge connecting part.

In the foregoing design, by disposing the first elastic member connected to the first swing arm and the second swing arm, the first swing arm and the second swing arm provide damping during relative rotation, improving use feeling.

In a possible implementation, the first elastic member is a torsion spring. The torsion spring includes a spiral part and a first torsion arm and a second torsion arm that are connected to two ends of the spiral part. The first torsion arm is the first elastic part, and the second torsion arm is the second elastic part.

In the foregoing design, the torsion spring includes the spiral part capable of increasing a bending deformation amount, increasing service life of the hinge assembly.

In a possible implementation, the hinge assembly further includes a first pin and a second pin. The first pin penetrates the first fastening part, the first hinge connecting part, and the first torsion arm. The second pin penetrates the second fastening part, the second hinge connecting part, and the second torsion arm.

In the foregoing design, the first pin is configured to connect the first swing arm, the slider, and the first elastic member, and the second pin is configured to connect the second swing arm, the slider, and the first elastic member, to enable elements connected to each other to move synchronously.

In a possible implementation, at least one of the first pin or the second pin is sleeved with a sleeve. The sleeve is in contact with the first torsion arm and/or the second torsion arm. The sleeve is configured to prevent the first torsion arm from moving relative to the first pin in the first direction, and/or the second torsion arm from moving relative to the second pin in the first direction.

In the foregoing design, the sleeve is configured to limit the first elastic member in the first direction, to keep an elastic force generated during deformation of the first elastic member to be perpendicular to the first direction.

In a possible implementation, the first pin and the second pin are both provided with the sleeves, the first torsion arm is clamped between the sleeve and the first hinge connecting part, and the second torsion arm is clamped between the second fastening part and the sleeve.

In the foregoing design, a possible implementation in which the first torsion arm and the second torsion arm is limited is provided.

In a possible implementation, the first elastic member is a C-shaped spring.

In the foregoing design, when the first elastic member is the C-shaped spring, a length of the hinge assembly in the first direction may be reduced, reducing space.

In a possible implementation, the guide groove includes a convex surface, and the convex surface protrudes toward the extension part. The hinge assembly further includes a second elastic member. The second elastic member is located between the extension part and the convex surface. When the extension part moves in the second direction, the second elastic member is enabled to deform.

In the foregoing design, the second elastic member deforms as a distance between the extension part and the convex surface changes, to implement fine adjustment of damping of the hinge assembly.

In a possible implementation, the hinge assembly further includes a damping rod and a cam. The damping rod is movably connected to the slider, and the damping rod may move relative to the slider in the first direction. The cam is firmly connected to the damping rod, and the cam abuts against the convex surface. The second elastic member is sleeved on the damping rod, and two ends of the second elastic member abut against the extension part and the cam respectively.

In the foregoing design, a possible implementation in which the second elastic member is deformed to achieve a change in a distance between the extension part and the convex surface is provided.

In a possible implementation, the slider includes an accommodation cavity. The accommodation cavity is formed by recessing in a first direction of a surface, away from the first fastening part and the second fastening part, of the extension part. One portion of the damping rod is located in the accommodation cavity, and the other portion of the damping rod protrudes from the accommodation cavity.

In the foregoing design, by using space of the slider, space of the damping rod in the first direction may be reduced.

In a possible implementation, the accommodation cavity includes a first accommodation part and a second accommodation part. The damping rod includes a first limiting part, a rod part, and a second limiting part. The first limiting part is located in the first accommodation part. A portion of the rod part is located in the second accommodation part.

The second elastic member is sleeved on the rod part. The cam is fastened to the second limiting part.

In the foregoing design, by matching the first accommodation part and the first limiting part, the damping rod can move relative to the slider but cannot rotate in the first direction.

In a possible implementation, the hinge assembly further includes a damping rod and a cam. The damping rod is firmly connected to the slider. The cam is movably connected to the damping rod. The cam may move relative to the damping rod in the first direction, and the cam abuts against the convex surface. The second elastic member is sleeved on the damping rod, and two ends of the second elastic member abut against the extension part and the cam respectively.

In the foregoing design, a possible implementation in which the second elastic member is deformed to achieve a change in a distance between the extension part and the convex surface is provided.

In a possible implementation, the base includes a first base block, a connecting block, and a second base block. The connecting block connects the first base block and the second base block. The guide groove is located on the first base block and/or the second base block.

In the foregoing design, the base is a basis for connection of various components, and the guide groove disposed on the base plays a role in limiting the slider.

In a possible implementation, the hinge assembly further includes a first fastened rod and a second fastened rod. The first fastened rod is fastened to the first base block and the second base block. The second fastened rod is fastened to the first base block and the second base block. The first fastened rod penetrates a joint between the first hinge connecting part and the first rotating part. The second fastened rod penetrates a joint between the second hinge connecting part and the second rotating part.

In the foregoing design, the first fastened rod and the second fastened rod firmly connected to the base enable the first swing arm and the second swing arm to rotate around respective axes of the first swing arm and the second swing arm.

In a possible implementation, an included angle between the first hinge connecting part and the first rotating part is less than or equal to 90° and less than or equal to 180°; and an included angle between the second hinge connecting part and the second rotating part is less than or equal to 90° and less than or equal to 180°.

According to a second aspect, this application provides a terminal product. The terminal product includes a hinge assembly.

5

Figure 7:
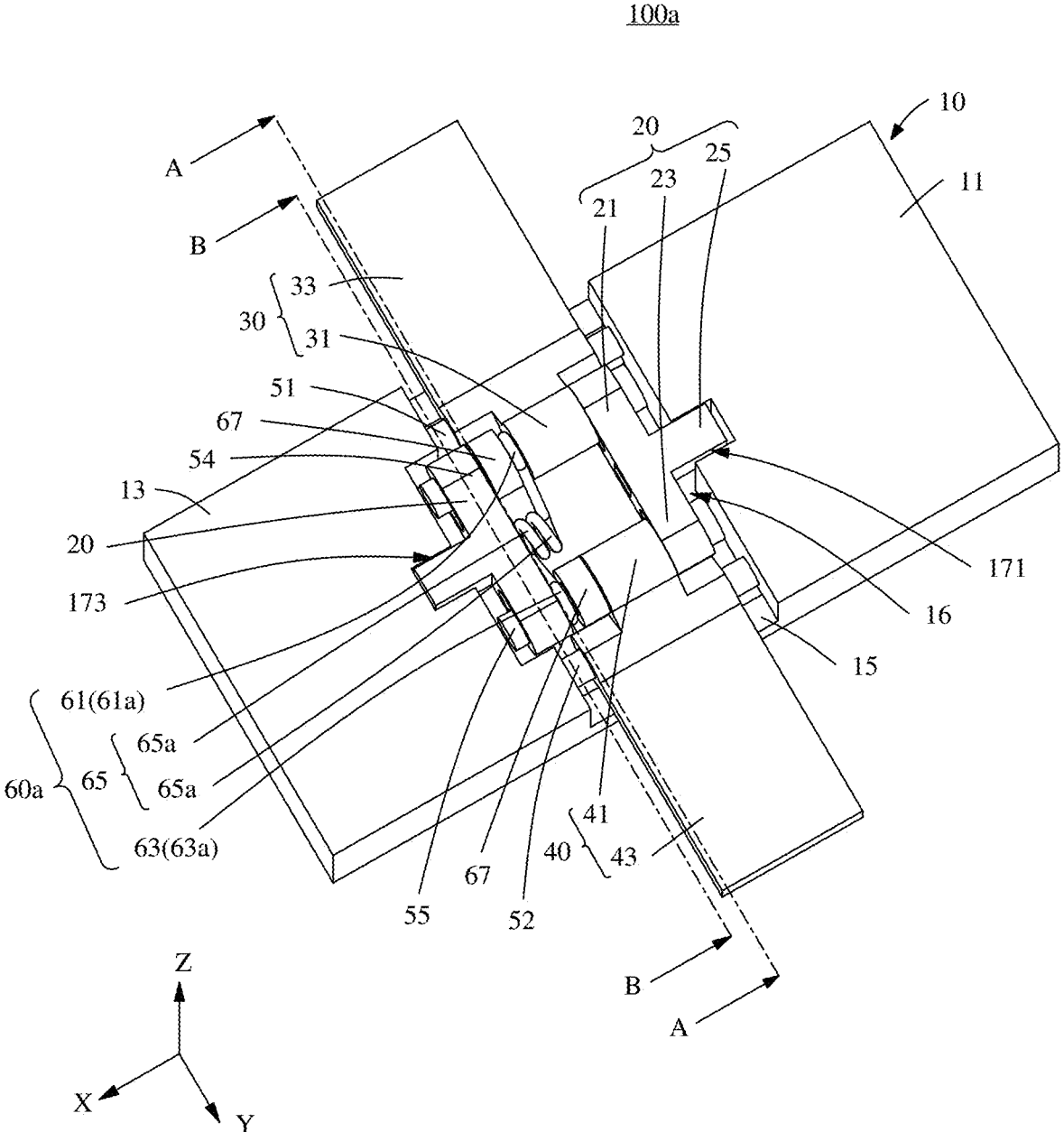
Figure 8:
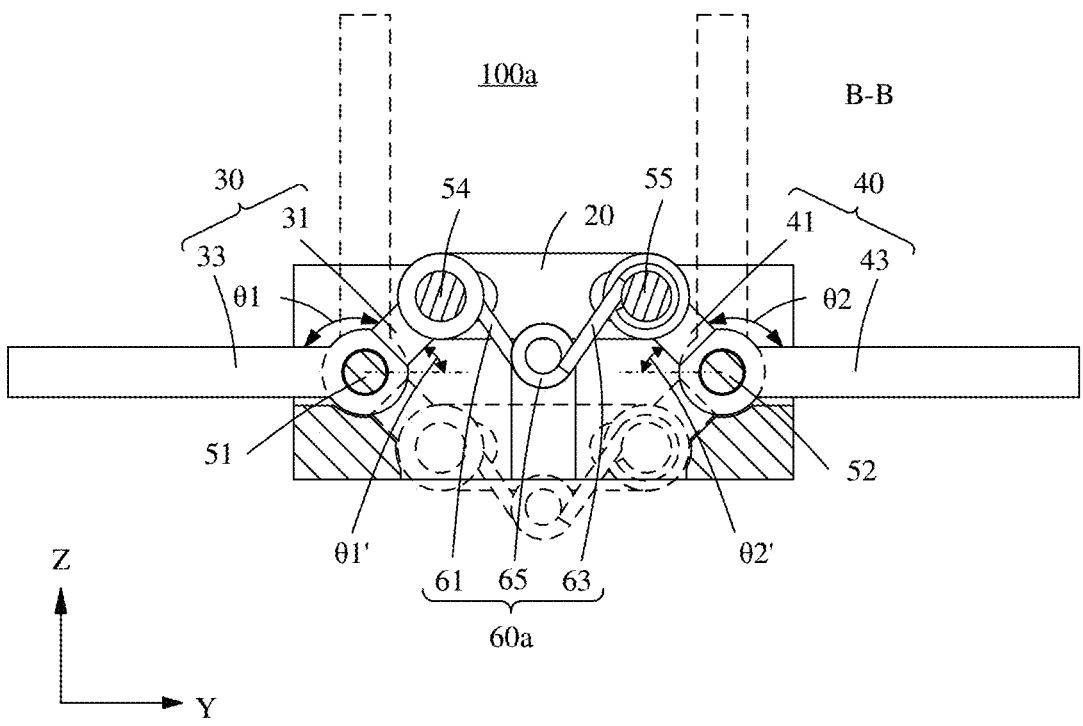
Figure 9:
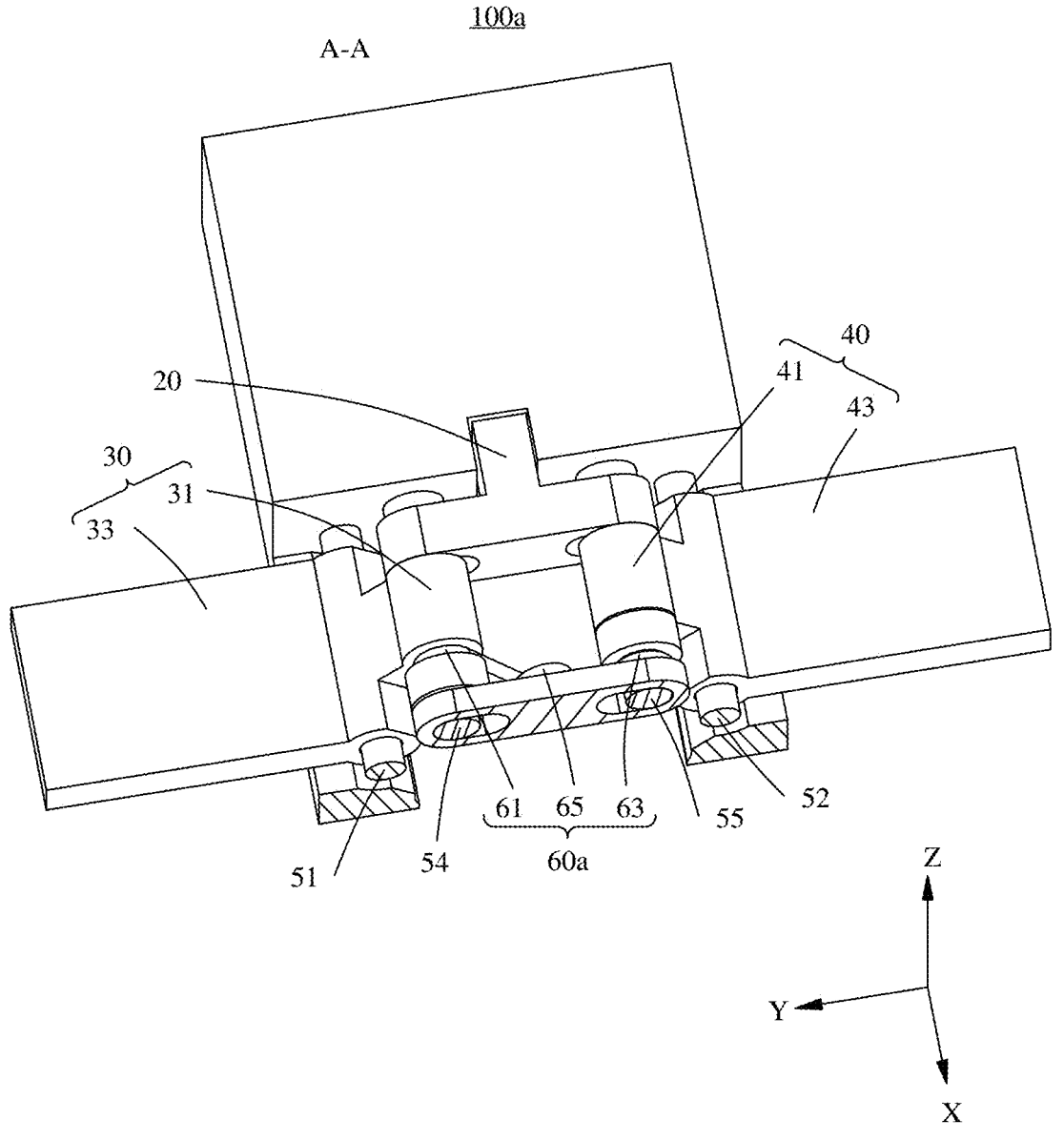
Figure 10:
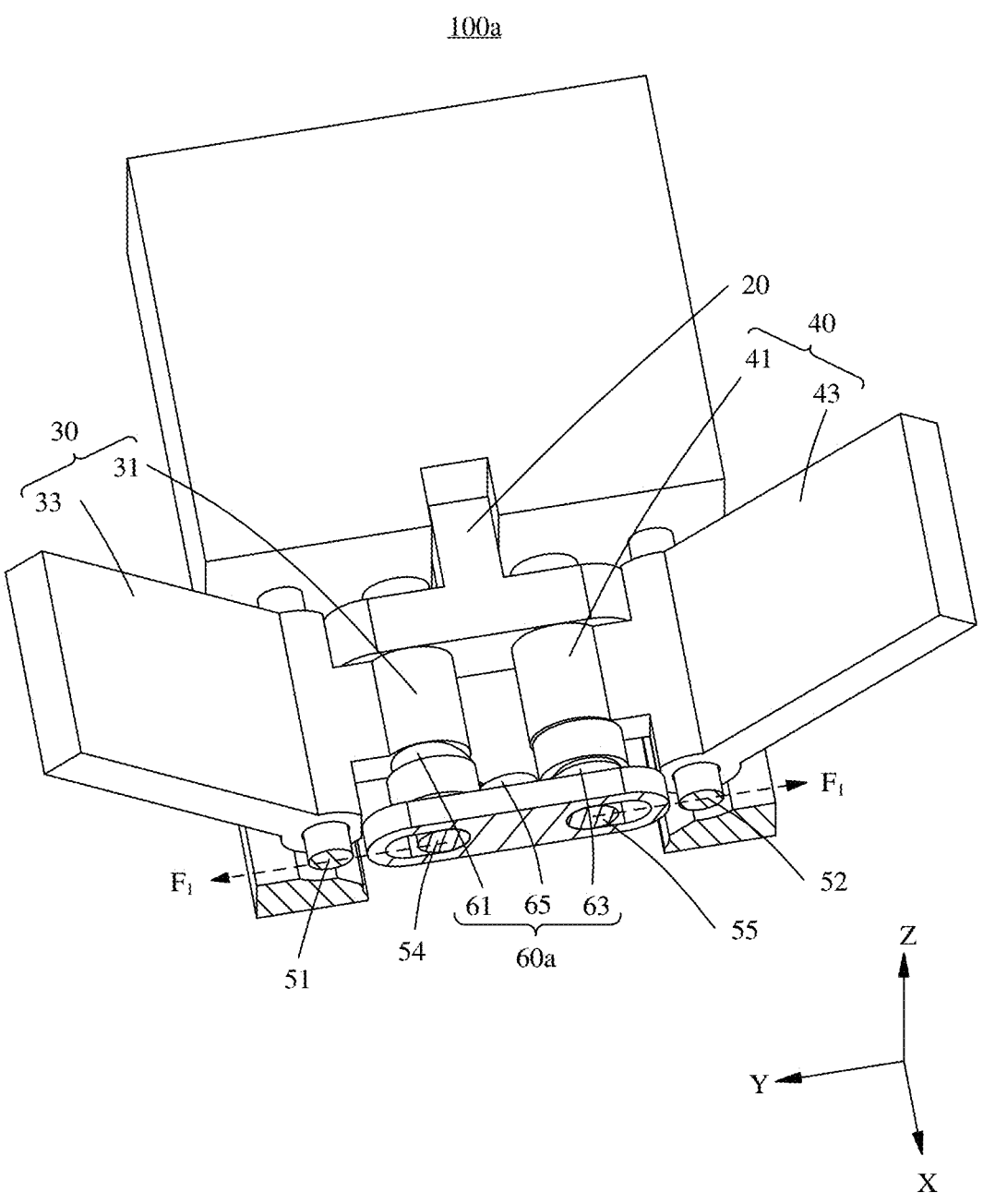
Figure 11:
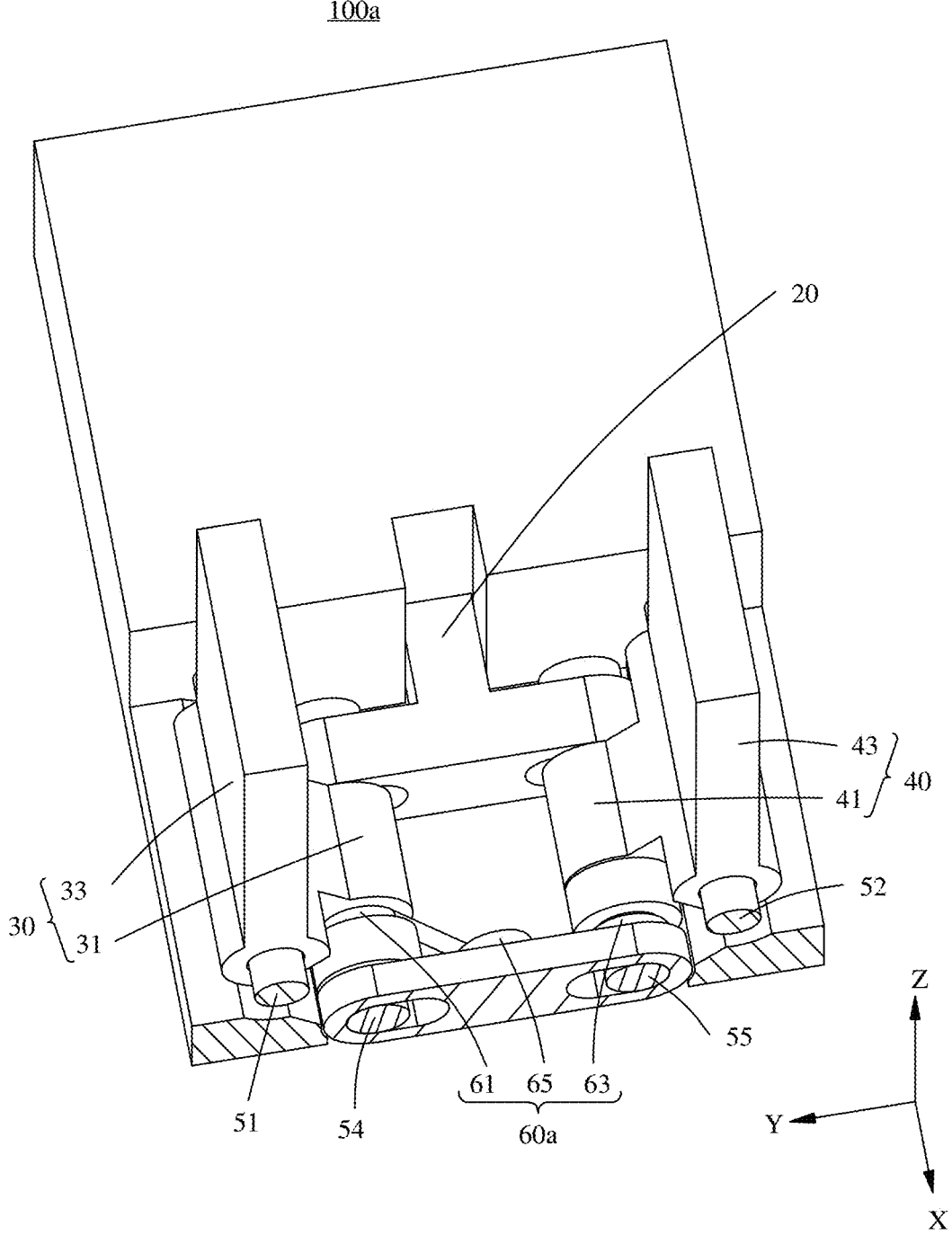
Figure 12:
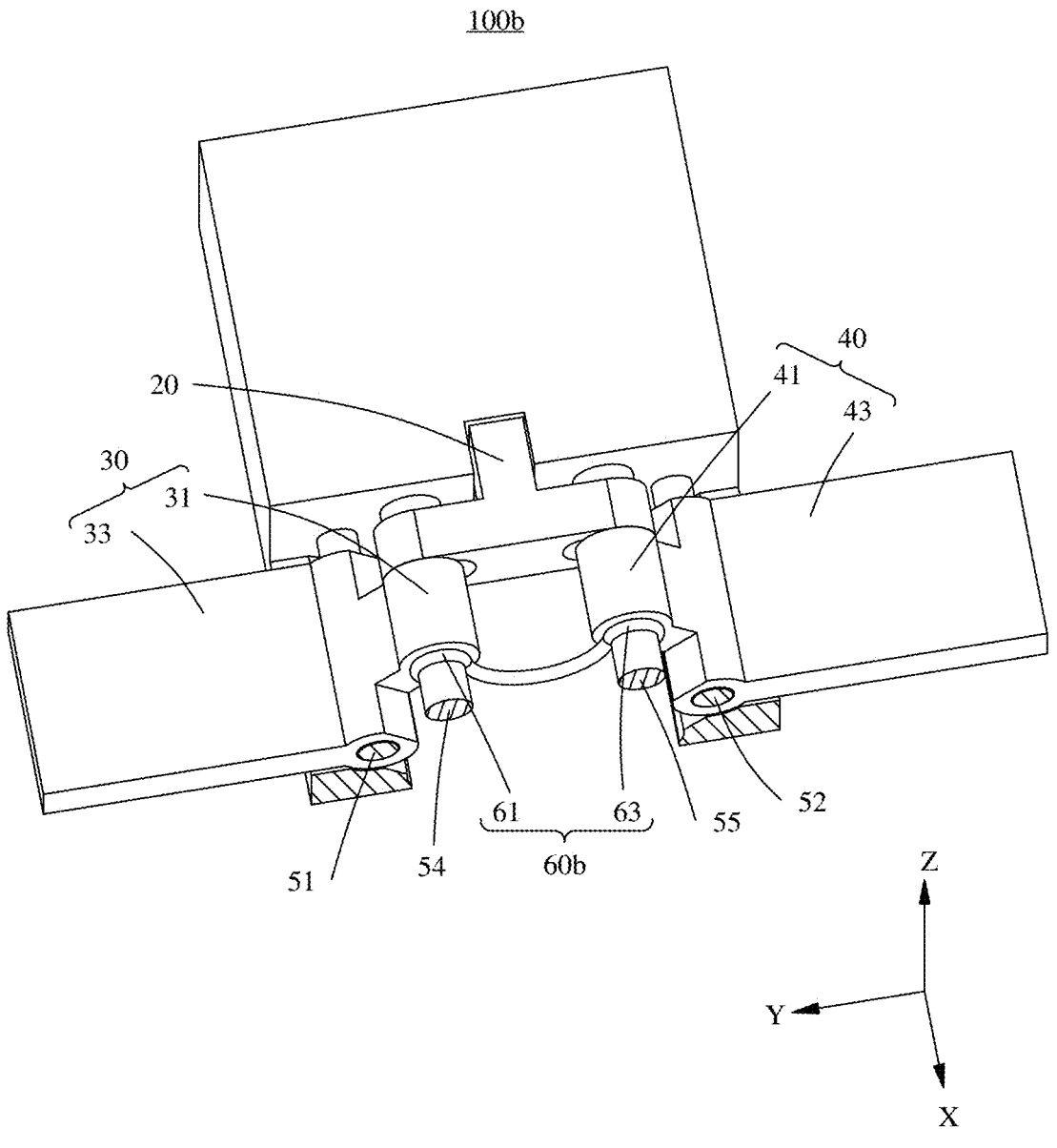
Figure 13:
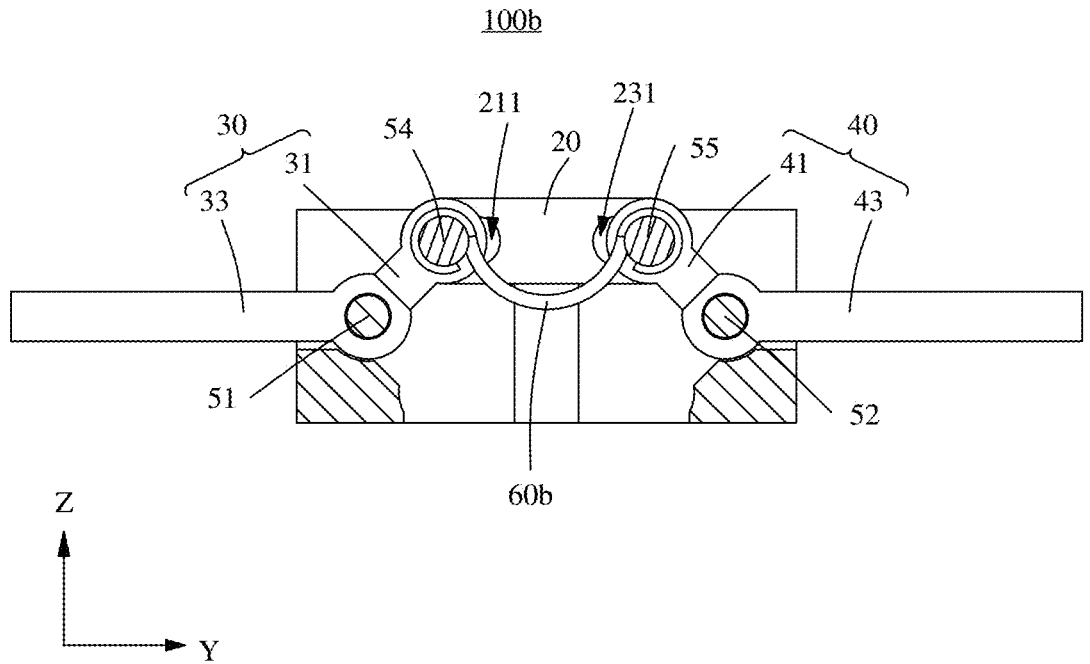
Figure 14:
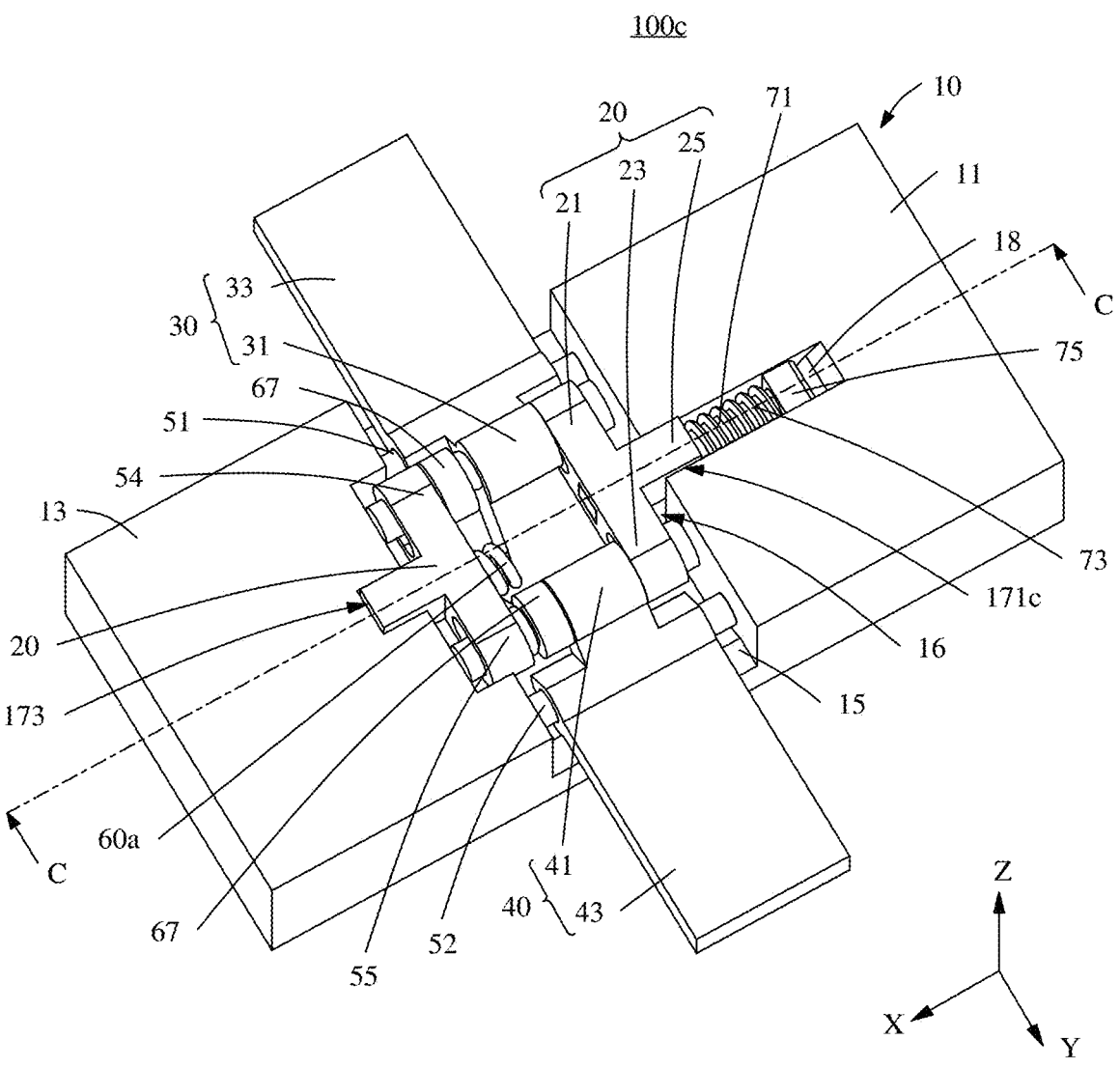
Figure 15:
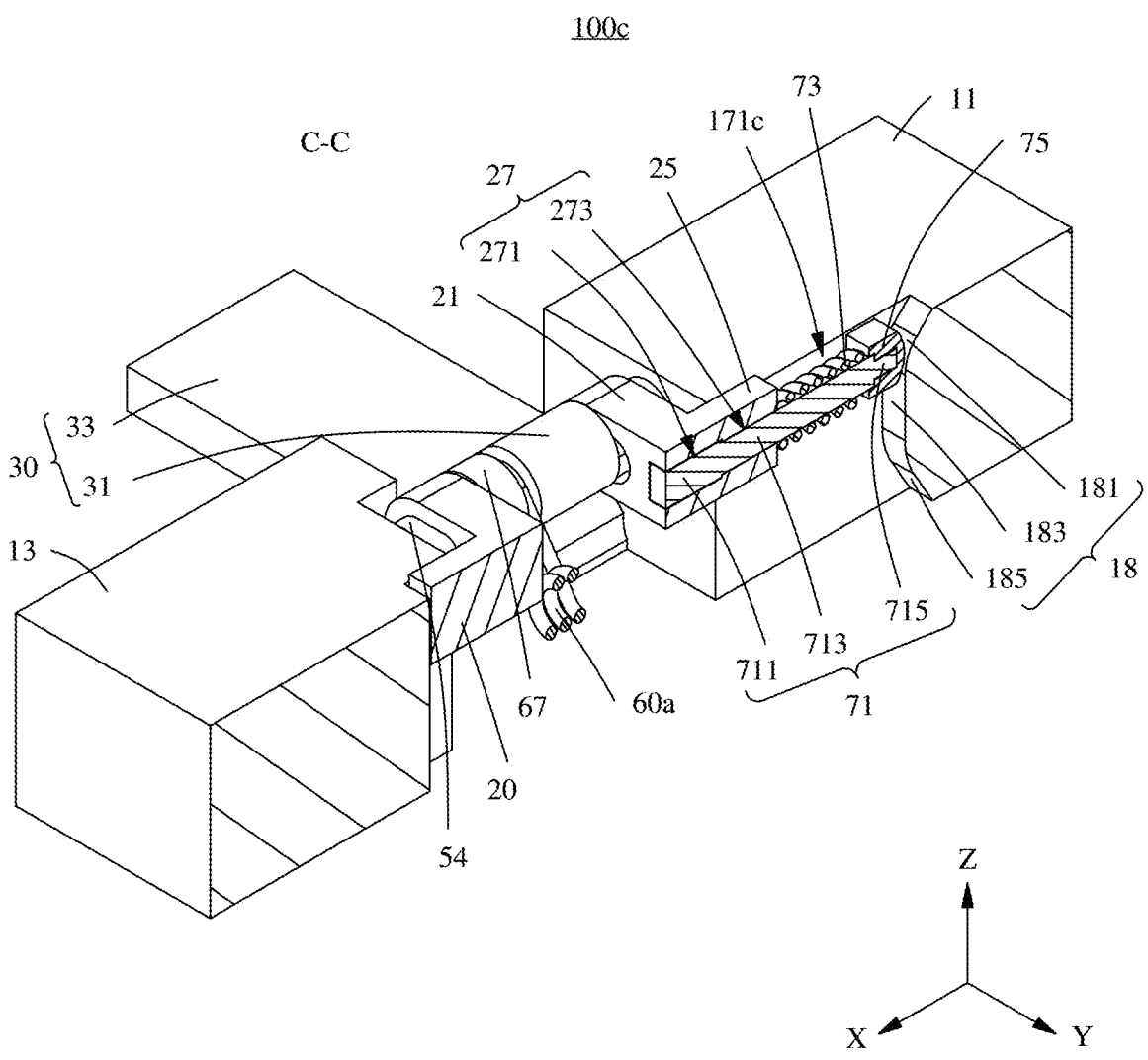
Figure 16:
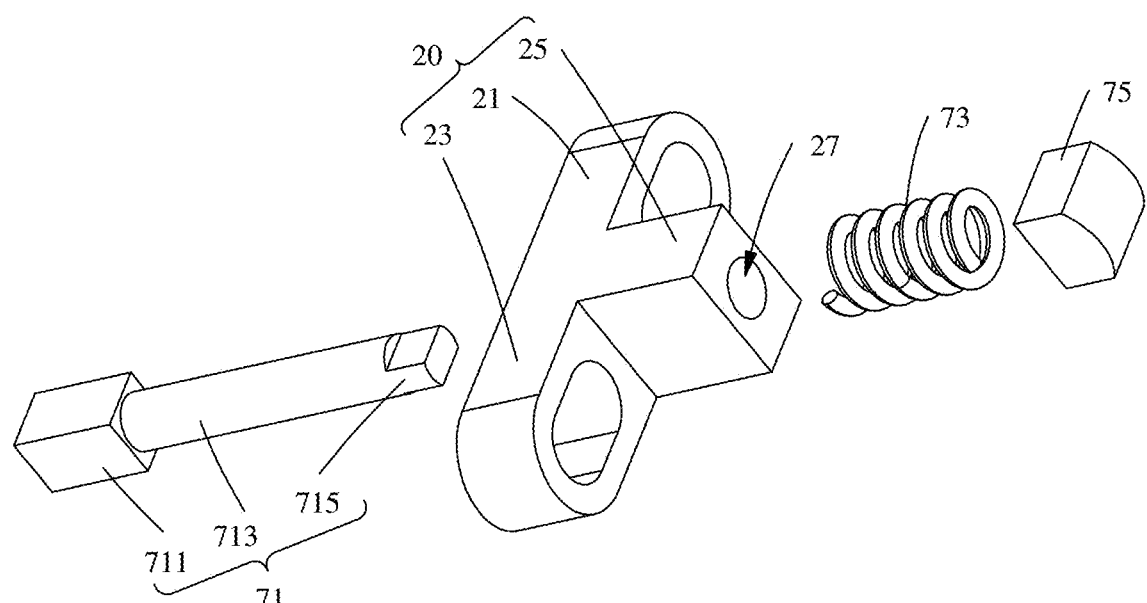
Figure 17:
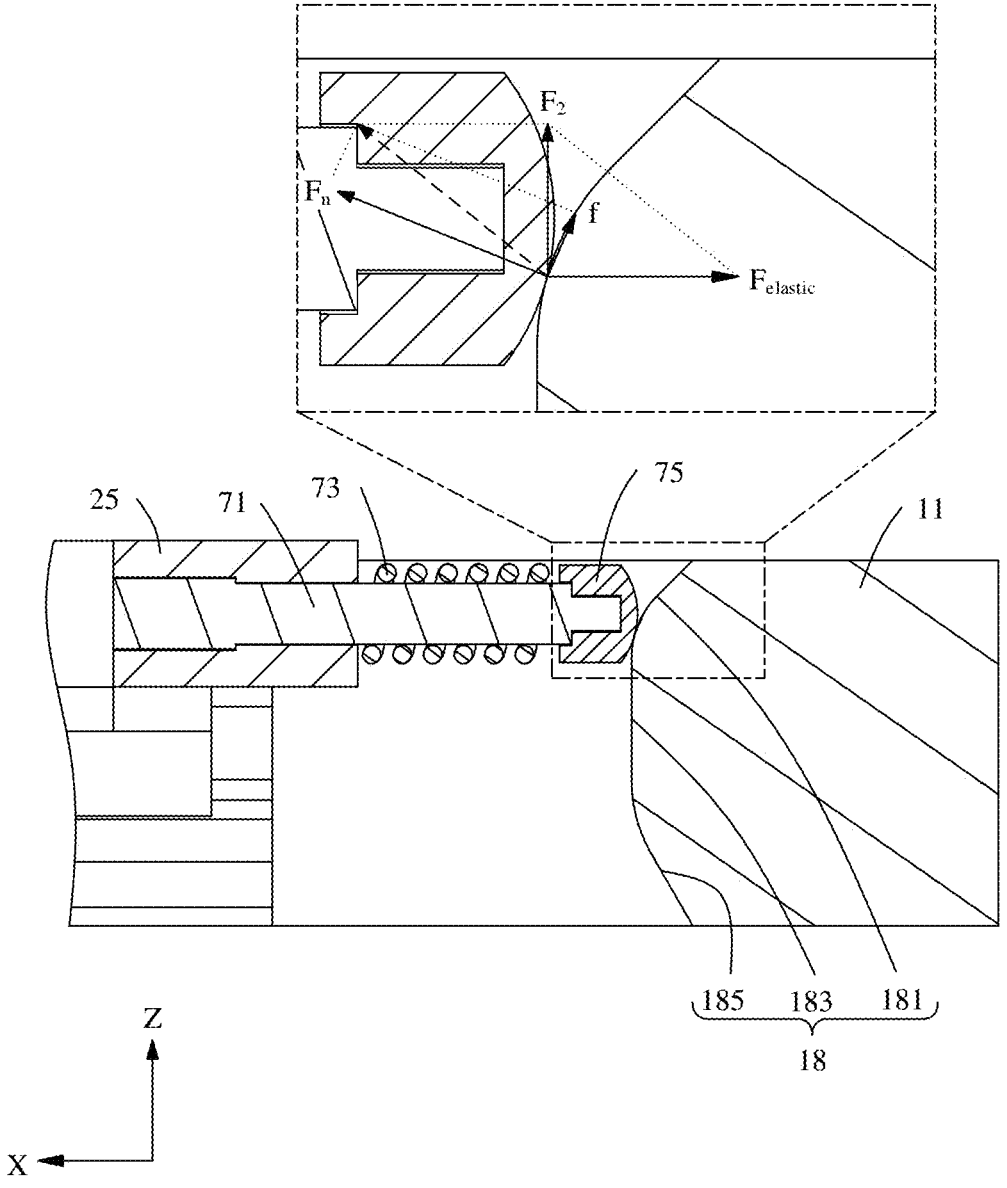
Figure 18:
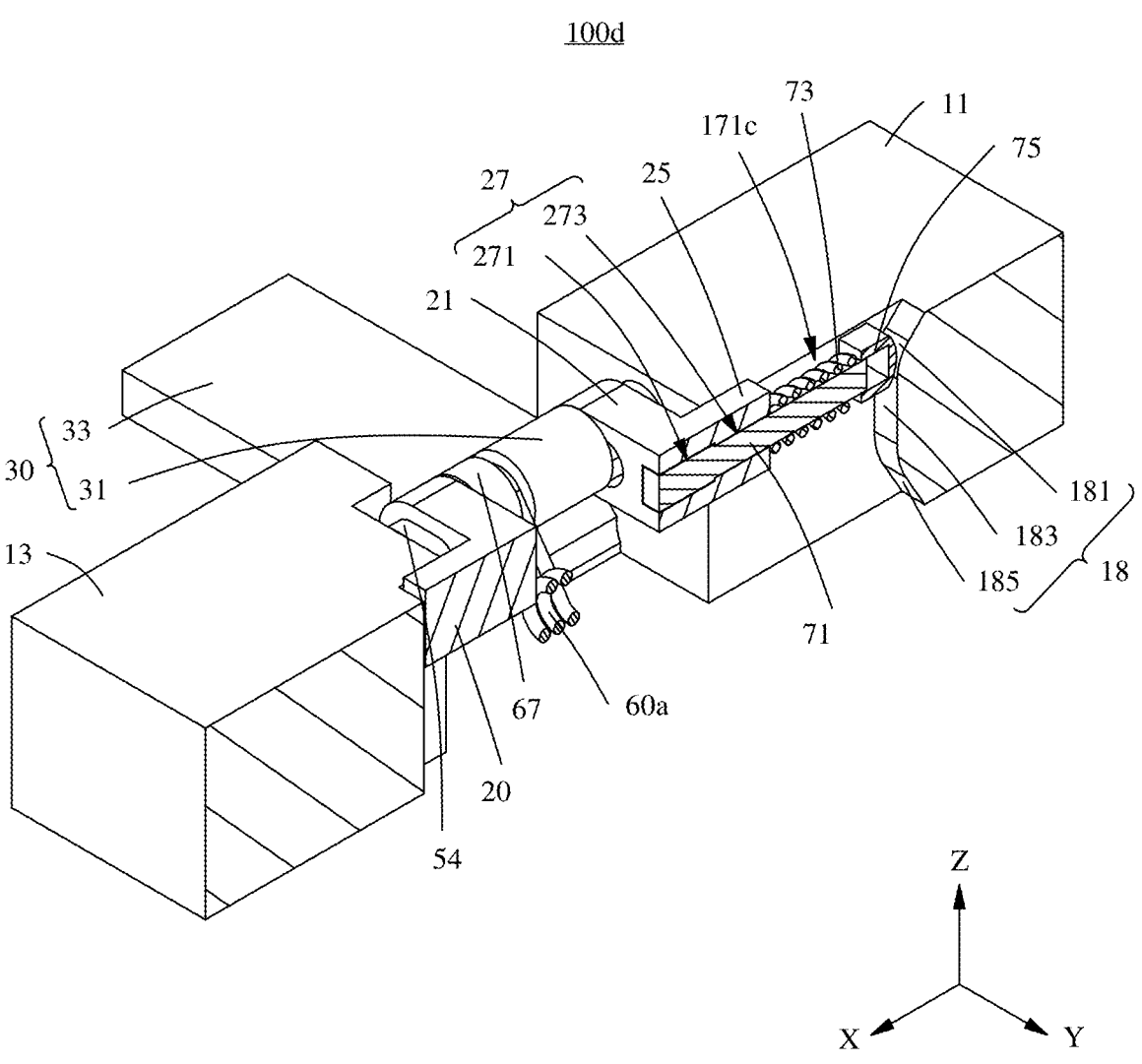

FIG. 7 is a schematic diagram of an overall structure of a hinge assembly according to some other embodiments of this application:

FIG. 8 is a schematic cross-sectional view of the hinge assembly shown in FIG. 7 in an A-A direction:

FIG. 9 is a schematic cross-sectional view of the hinge assembly shown in FIG. 7 in a B-B direction with an included angle of 180° between a first swing arm and a second swing arm:

FIG. 10 is a schematic cross-sectional view of the first swing arm and the second swing arm in the hinge assembly shown in FIG. 9 when rotating relative to each other to an included angle of 90°:

FIG. 11 is a schematic cross-sectional view of the first swing arm and the second swing arm in the hinge assembly shown in FIG. 10 when rotating relative to each other to an included angle of 0°:

FIG. 12 is a schematic cross-sectional view of a hinge assembly according to still some other embodiments of this application:

FIG. 13 is a schematic cross-sectional view of the hinge assembly shown in FIG. 12 in another orientation:

FIG. 14 is a schematic diagram of an overall structure of a hinge assembly according to yet some embodiments of this application:

FIG. 15 is a schematic cross-sectional view of the hinge assembly shown in FIG. 14 in a C-C direction:

FIG. 16 is an exploded view of some components in FIG. 14;

FIG. 17 is a schematic diagram of force analysis of a cam when the cam moves relative to a convex surface; and FIG. 18 is a schematic cross-sectional view of a hinge assembly according to still yet some other embodiments of this application.

REFERENCE NUMERALS OF MAIN COMPONENTS terminal product: 200; first body: 210; second body: 220; hinge assemblies: 100, 100*a*, 100*b*, 100*c*, and 100*d*; base: 10; first base block: 11; second base block: 13; connecting block: 15; accommodation groove: 16; guide groove: 17; first guide grooves: 171 and 171*c*; second guide groove: 173; convex surface: 18; first arc surface: 181; second arc surface: 183; third arc surface: 185; slider: 20; first fastening part: 21; first slide rail: 211; second fastening part: 23; second slide rail: 231; extension part: 25; accommodation cavity: 27; first accommodation part: 271; second accommodation part: 273; first swing arm: 30; first hinge connecting part: 31; first rotating part: 33; through holes: 35 and 36; second swing arm: 40; second hinge connecting part: 41; second rotating part: 43; through holes: 45 and 46; first fastened rod: 51; second fastened rod: 52; first pin: 54; second pin: 55; first elastic members: 60*a*, 60*b*; first elastic part: 61; first torsion arm: 61*a*; second elastic part: 63; second torsion arm: 63*a*; spiral part: 65; ring part: 65*a*; sleeve: 67; damping rods: 71 and 71*d*; first limiting part: 711; rod part: 713; second limiting part: 715; second elastic member: 73; cams: 75 and 75*d*; included angles: θ1, θ1', θ2, and θ2'; gear: 300'; tooth: 310'.

DESCRIPTION OF EMBODIMENTS

To better understand the foregoing objectives, features, and advantages of this application, this application is described in detail below with reference to accompanying drawings and specific implementations. It should be noted that implementations in this application and features in the implementations may be mutually combined in case of no conflict. In the following description, a lot of specific details are set forth to facilitate a full understanding of this application, and described implementations are only a part but not of the implementations of this application.

Unless otherwise defined, all technical and scientific terms used in this specification have same meanings as those usually understood by a person skilled in the art of this application. Terms used in this specification of this application are merely for the purpose of describing specific implementations, and are not intended to limit this application. A term "and/or" in this specification includes all and any combinations of one or more of associated listed items.

In each embodiment of this application, for ease of describing but not limiting this application, a term "connection" used in this specification and claims of this application is not limited to a physical or mechanical connection, regardless of a direct connection or an indirect connection. "Upper", "lower", "above", "below", "left", "right" and the like are intended to only indicate a relative positional relationship. When absolute positions of the described object change, the relative positional relationship changes accordingly as well.

Figure 1:
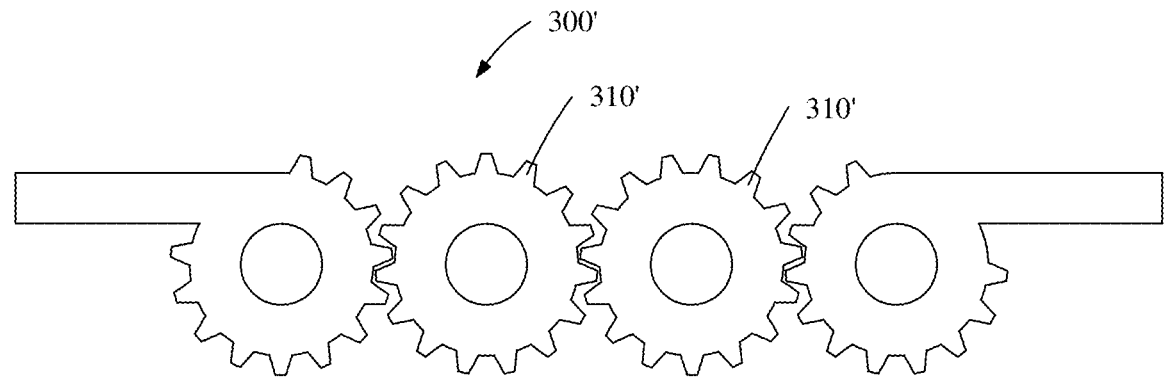
FIG. 1 is a schematic diagram of a partial structure of gear meshing provided in a conventional technology.
Figure 2:
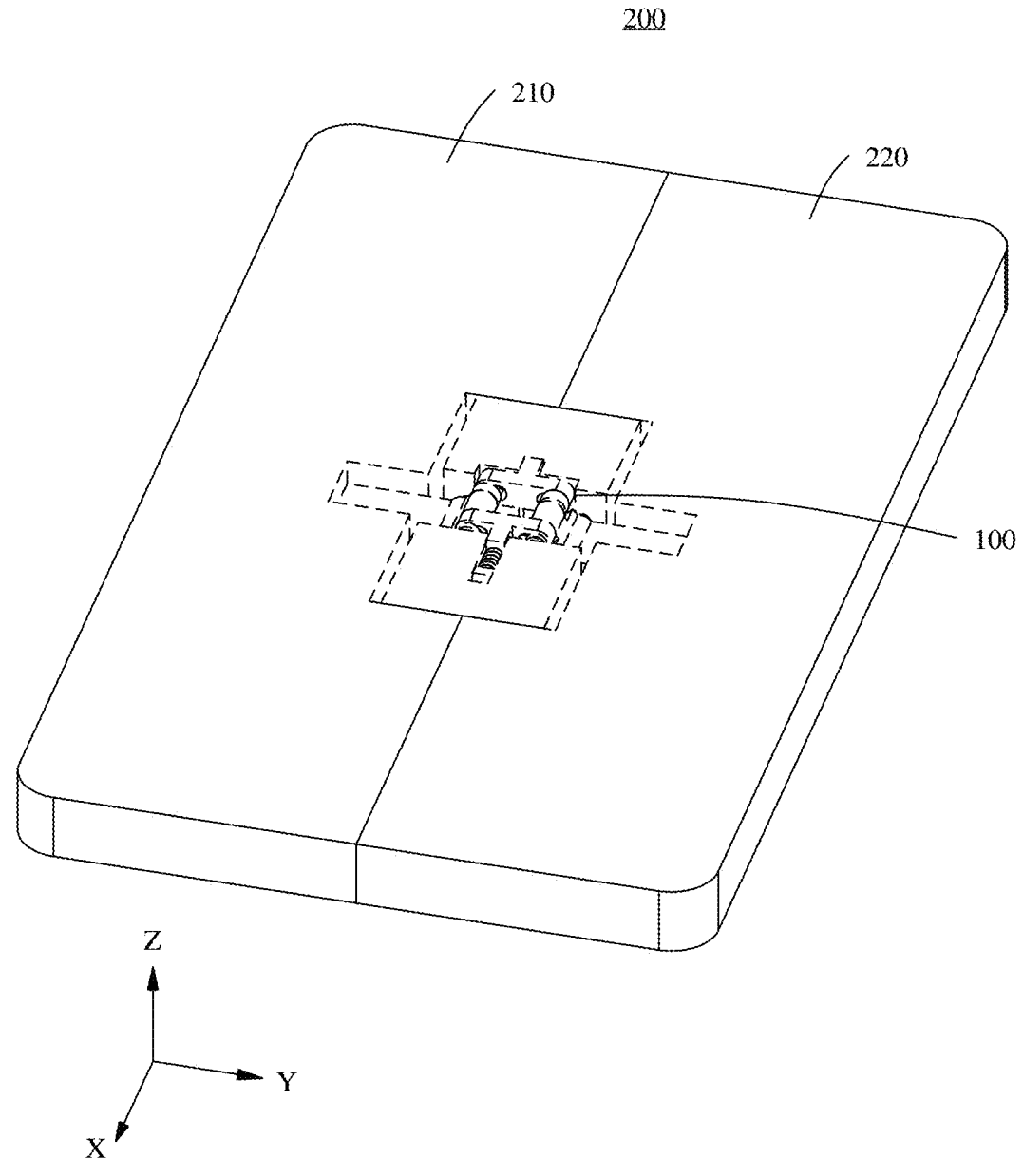
FIG. 2 is a schematic diagram of a structure of a foldable mobile phone in an unfolded state according to an embodiment of this application.
Figure 3:
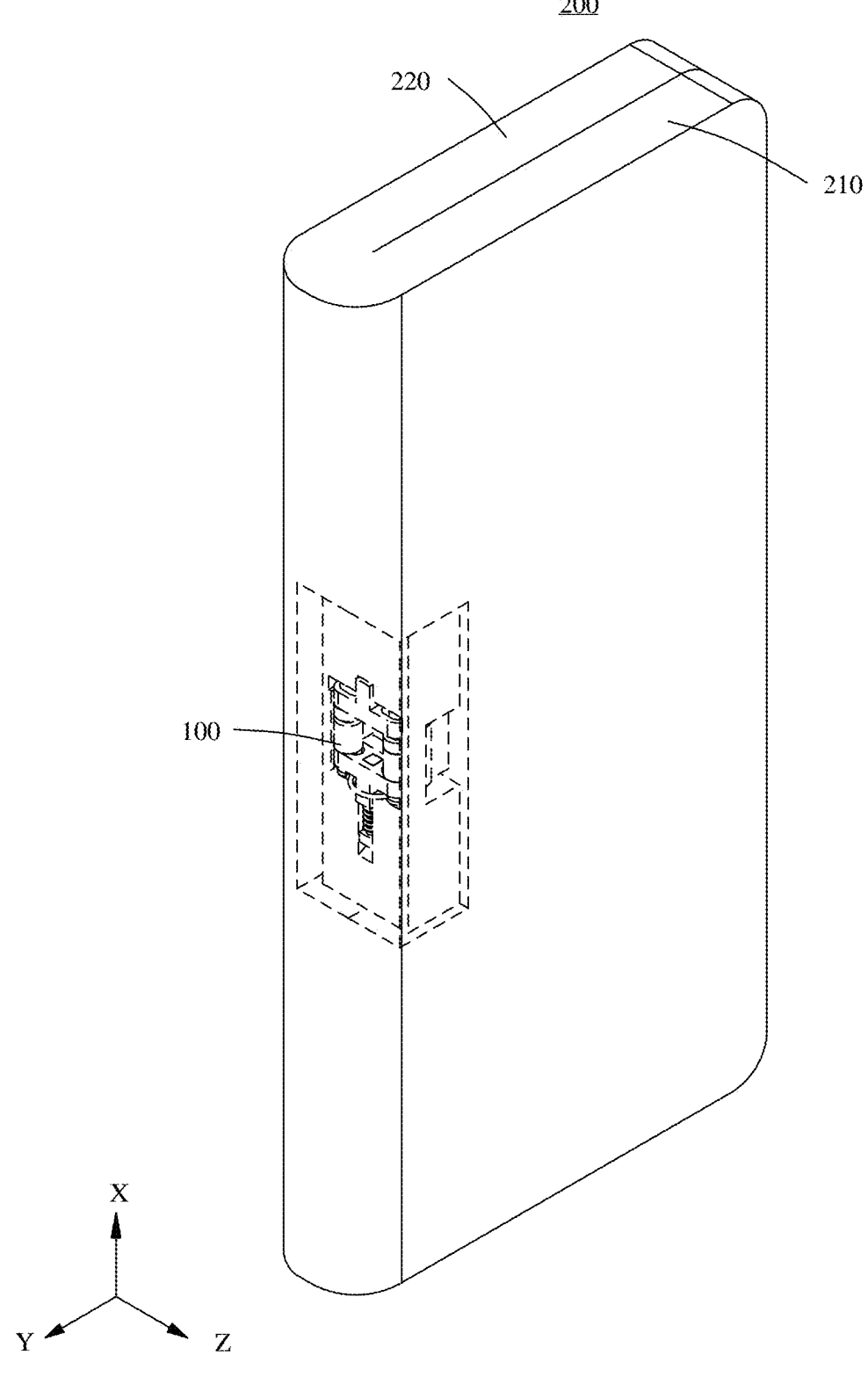
FIG. 3 is a schematic diagram of a structure of the foldable mobile phone shown in FIG. 2 in a folded state.

FIG. 2 and FIG. 3 are respectively schematic diagrams of a structure of a terminal product 200 in different states according to embodiments of this application. The terminal product 200 is a product in which a hinge assembly 100 may be used. The terminal product 200 may be an electronic product, including but not limited to a mobile phone, a notebook computer, a camera, an unmanned aerial vehicle, a desk lamp, or the like. The terminal product 200 may alternatively be a non-electronic product, including but not limited to a Bluetooth earphone box, a glasses case, or the like. In the embodiments shown in FIG. 2 and FIG. 3, the terminal product 200 is a foldable mobile phone.

The terminal product 200 further includes a first body 210 and a second body 220. The hinge assembly 100 connects the first body 210 and the second body 220. A relative angle between the first body 210 and the second body 220 may be changed through an action of the hinge assembly 100.

Specific names of the first body 210 and the second body 220 are related to an actual application scenario of the hinge assembly 100. For example, when the terminal product 200 is the foldable mobile phone, both the first body 210 and the second body 220 are parts at which a screen is located. When the terminal product 200 is the notebook computer, the first body 210 may be the part at which a screen is located, and the second body 220 may be a part at which a keyboard is located. An included angle between the first body 210 and the second body 220 of the mobile phone shown in FIG. 2 is 180° (that is, a screen of the mobile phone is in an unfolded state), and an angle between the first body 210 and the second body 220 of the mobile phone shown in FIG. 3 is 0° (that is, the screen of the mobile phone is in a folded state).

Figure 4:
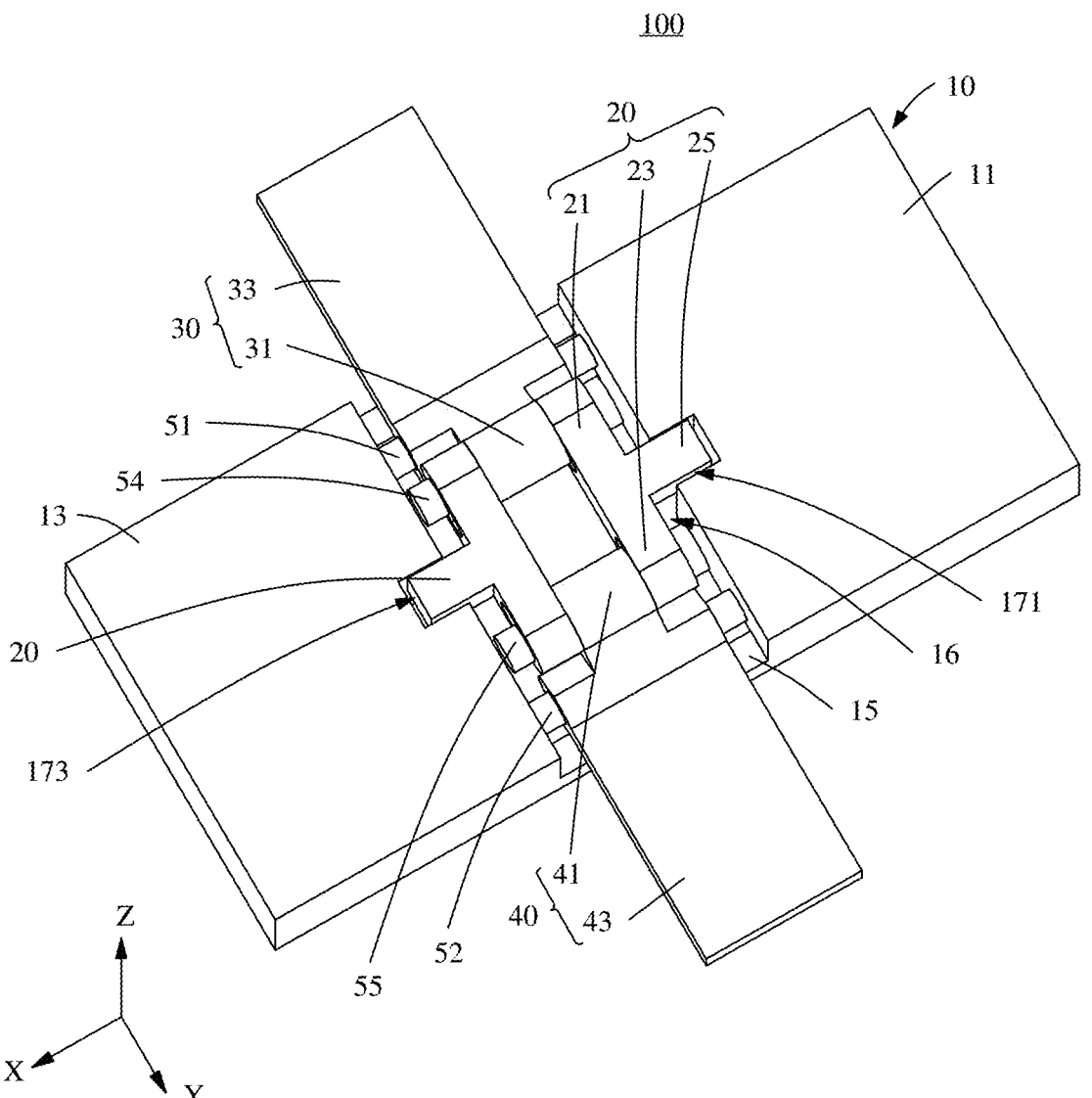
FIG. 4 is a schematic diagram of an overall structure of a hinge assembly according to some embodiments of this application.

FIG. 4 is a schematic diagram of an overall structure of the hinge assembly 100. The hinge assembly 100 includes a base 10, a first swing arm 30, a second swing arm 40, and a slider 20. The first swing arm 30 is configured to be firmly connected to the first body 210, and the second swing arm 40 is configured to be firmly connected to the second body 220. Both the first swing arm 30 and the second swing arm 40 may be rotatably connected relative to the base 10 in a first direction. The first swing arm 30 and the second swing arm 40 are both movably connected to the slider 20. The base 10 is configured to limit movement of the slider 20 in a second direction. Movement of the slider 20 drives the first swing arm 30 and the second swing arm 40 to rotate synchronously. The hinge assembly 100 replaces a component with a gear 300' used as a hinge assembly in a conventional technology, fundamentally preventing problems such as high costs caused by processing of nonstandard gears, an abnormal noise caused by meshing rotation of the gears 300', and breaking of a tooth 310'.

For ease of description, the first swing arm 30 and the second swing arm 40 may be defined to rotate in an X-axis direction (the first direction), that is, the mobile phone may be folded in the X-axis direction. After the mobile phone is folded, the first body 210 and the second body 220 are stacked in the Z-axis direction (the second direction), the X-axis direction and the Z-axis direction are perpendicular to each other, and a direction perpendicular to the X-axis direction and the Z-axis direction is a Y-axis direction (a third direction). It should be noted that the "perpendicular" and "parallel" in this application are not mathematically strictly defined, and may have assembly errors, manufacturing errors, and the like. In addition, in other implementations, the first direction and the second direction are not limited to being perpendicular to each other, and the first direction may only intersect the second direction. That is, a direction in which the base limits movement of the slider 20 intersects with an axis direction in which the first swing arm 30 rotates (or an axis direction in which the second swing arm 40 rotates). This can achieve a function in which the movement of the slider 20 drives the first swing arm 30 and the second swing arm 40 to rotate synchronously.

Figure 5:
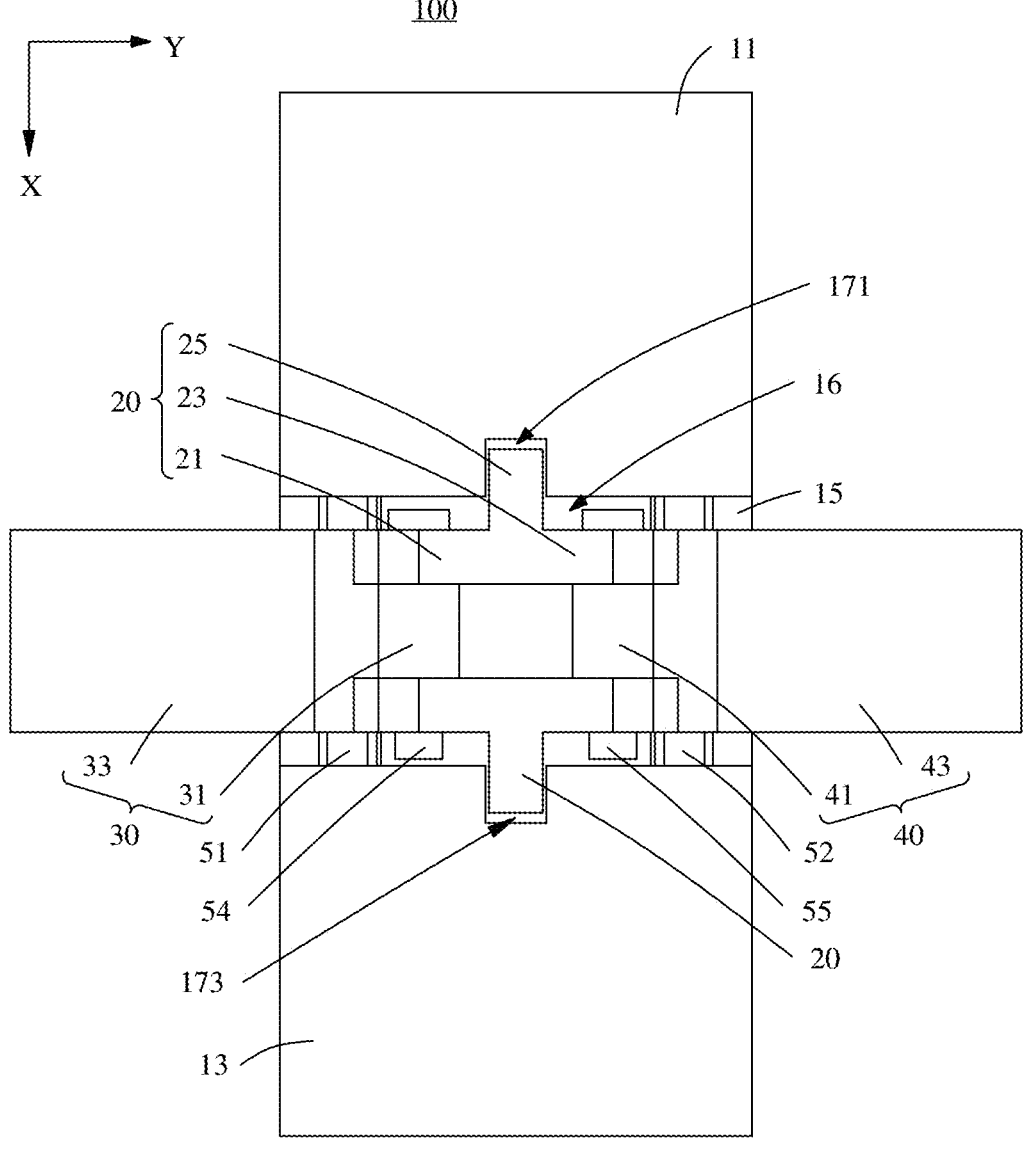
FIG. 5 is a top view of the hinge assembly shown in FIG. 4.
Figure 6:
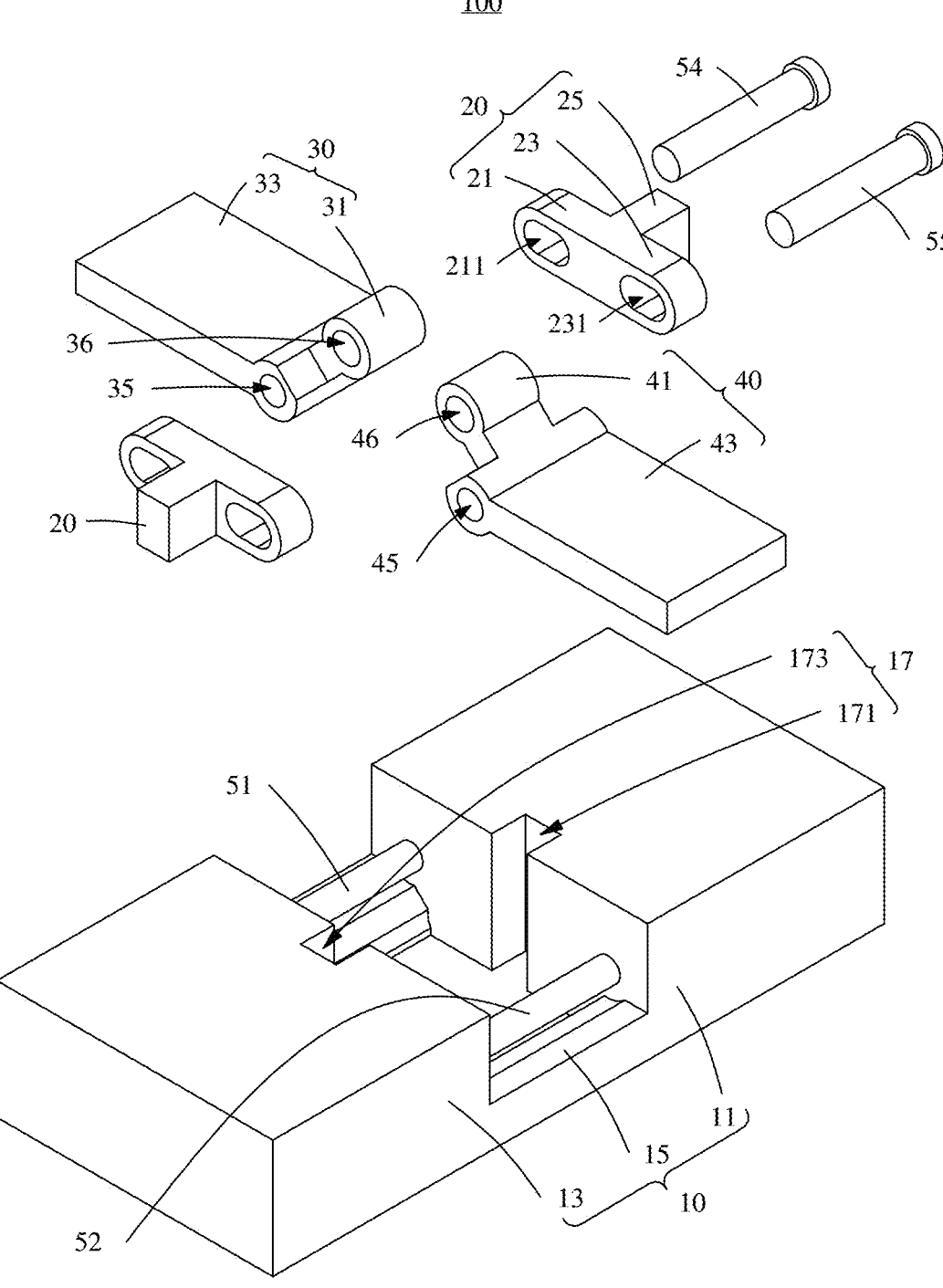
FIG. 6 is an exploded view of the hinge assembly shown in FIG. 5.

With reference to FIG. 5 and FIG. 6, FIG. 5 is a top view of the hinge assembly 100 shown in FIG. 4, and FIG. 6 is an exploded view of the hinge assembly 100 shown in FIG. 5. The base 10 includes a first base block 11, a second base block 13, and a connecting block 15. The first base block 11, the connecting block 15, and the second base block 13 are arranged in sequence in the X-axis direction, and the connecting block 15 is firmly connected to the first base block 11 and the second base block 13. The connecting block 15 is recessed relative to the first base block 11 and the second base block 13 in the Z-axis direction. This enables the base 10 to have an accommodation groove 16. The first swing arm 30, the second swing arm 40, and the slider 20 may be accommodated in the accommodation groove 16 and may move in the accommodation groove 16.

The base 10 is provided with a guide groove 17. The guide groove 17 communicates with the accommodation groove 16. The guide groove 17 is configured to limit movement of the slider 20 in the Z-axis in the guide groove 17. In this embodiment, there are two guide grooves 17, respectively named a first guide groove 171 and a second guide groove 173. A quantity of the guide grooves 17 is the same as a quantity of the sliders 20. The first base block 11 is provided with the first guide groove 171, and the second base block 13 is provided with the second guide groove 173. The first guide groove 171 is formed by recessing of a surface, toward the second base block 13, of the first base block 11 in a direction away from the second base block 13. The first guide groove 171 penetrates two opposite surfaces of the first base block 11 in the Z-axis direction. The first guide groove 171 is strip-shaped in the Z-axis direction. The second guide groove 173 is formed by recessing of a surface, toward the first base block 11, of the second base block 13 in a direction away from the first base block 11. The second guide groove 173 penetrates two opposite surfaces of the second base block 13 in the Z-axis direction. The second guide groove 173 is strip-shaped in the Z-axis direction. In another embodiment, the first guide groove 171 may alternatively not penetrate the two opposite surfaces of the first base block 11 in the Z-axis direction, and the second guide groove 173 may alternatively not penetrate the two opposite surfaces of the second base block 13 in the Z-axis direction, provided that movement space for the slider 20 is met.

There is at least one slider 20. The quantity of the sliders 20 can ensure that the first swing arm 30 and the second swing arm 40 are driven to rotate synchronously. In this embodiment, there are two sliders 20. Each slider 20 includes a first fastening part 21, a second fastening part 23 that are firmly connected, and an extension part 25. The first fastening part 21 and the second fastening part 23 are arranged in the Y-axis direction. The extension part 25 is formed by extending a surface of a joint between the first fastening part 21 and the second fastening part 23 in the X-axis direction. The extension part 25 is a rectangular block, and the first fastening part 21, the second fastening part 23, and the extension part 25 roughly form a T-shaped structure.

The extension part 25 is located in a correspondingly disposed guide groove 17. That is, an extension part 25 of one slider 20 is located in the first guide groove 171, and an extension part 25 of the other slider 20 is located in the second guide groove 173. A width of the extension part 25 in the Y-axis direction matches a width of the guide groove 17 in the Y-axis direction. That is, the width of the extension part 25 is approximate to the width of the guide groove 17 in addition to an assembly tolerance reserved between the guide groove 17 and the extension part 25. This enables the guide groove 17 to play a role in limitation, and further enables the slider 20 to do straight line motion in the Z-axis direction, but not rotate within the guide groove 17.

The first fastening part 21 is provided with a first slide rail 211. The first slide rail 211 penetrates the first fastening part 21 in the X-axis direction. The second fastening part 23 is provided with a second slide rail 231. The second slide rail 231 penetrates the second fastening part 23 in the X-axis direction. The first slide rail 211 and the second slide rail 231 are arranged at an interval and extended in the Y-axis direction. The first fastening parts 21 and the second fastening parts 23 of the two sliders 20 are both located in the accommodation groove 16. One extension part 25 of one slider 20 is located in the first guide groove 171 and may do straight motion in the Z-axis direction. One extension part 25 of the other slider 20 is located in the second guide groove 173, and may do straight line motion in the Z-axis direction. Motion of the two sliders 20 is synchronized.

The hinge assembly 100 further includes a first fastened rod 51 and a second fastened rod 52. Both the first fastened rod 51 and the second fastened rod 52 are columnar. Both the first fastened rod 51 and the second fastened rod 52 extend in the X-axis direction. That is, the first fastened rod 51 and the second fastened rod 52 may be disposed in parallel. One end of the first fastened rod 51 is fastened to the first base block 11, and the other end of the first fastened rod 51 is fastened to the second base block 13. The first fastened rod 51 penetrates the first swing arm 30, and the first swing arm 30 rotates by using the first fastened rod 51 as a first axis. One end of the second fastened rod 52 is fastened to the first base block 11, and the other end of the second fastened rod 52 is fastened to the second base block 13. The second fastened rod 52 penetrates the second swing arm 40. The second swing arm 40 rotates around the second fastened rod 52 as a second axis in a direction opposite to a rotation direction of the first swing arm 30. Both the first axis and the second axis are fastened relative to the base 10.

The first swing arm 30 includes a first hinge connecting part 31 and a first rotating part 33 that are firmly connected. A through hole 35 is disposed at a joint between the first hinge connecting part 31 and the first rotating part 33. The first fastened rod 51 penetrates the through hole 35, that is, the first hinge connecting part 31 and the first rotating part 33 are located on two opposite sides of the first axis. The second swing arm 40 includes a second hinge connecting part 41 and a second rotating part 43 that are firmly connected. A through hole 45 is disposed at a joint between the second hinge connecting part 41 and the second rotating part 43. The second fastened rod 52 penetrates the through hole 45, that is, the second hinge connecting part 41 and the second rotating part 43 are located on two opposite sides of the second axis. When the hinge assembly 100 is in an unfolded state, the first hinge connecting part 31 and the second hinge connecting part 41 are close to each other, and the first rotating part 33 and the second rotating part 43 are far away from each other.

In this embodiment, an included angle θ1 (refer to FIG. 8) between the first hinge connecting part 31 and the first rotating part 33 is 135°, that is, an included angle θ1' between a reverse extension line of the first hinge connecting part 31 and a reverse extension line of the first rotating part 33 is 45°, and a direction of the first body 210 and a direction of the first rotating part 33 are the same. An included angle θ2 between the second hinge connecting part 41 and the second rotating part 43 is 135°, that is, an included angle θ2' between a reverse extension line of the second hinge connecting part 41 and a reverse extension line of the second rotating part 43 is 45°, and a direction of the second body 220 and a direction of the second rotating part 43 are the same.

When the included angle between the first hinge connecting part 31 and the first rotating part 33 is 135°, and the included angle between the second hinge connecting part 41 and the second rotating part 43 is 135°, during change of an included angle between the first rotating part 33 and the second rotating part 43 from 180° to 0°, rotation space for the hinge structure 100 is symmetrical to both sides of a plane in which the first fastened rod 51 and the second fastened rod 52 are located. When the hinge structure 100 is actually used in a mobile phone, the hinge structure 100 is disposed in a middle region of the mobile phone in the Z-axis direction, reducing space for the mobile phone in the Z-axis direction.

When the hinge structure 100 is used in a mobile phone, a value of the included angle θ1 may be 90°≤θ1≤170°, and a value of the included angle θ2 may be 90°≤θ2≤170°. For example, the terminal product 200 is a mobile phone, the included angle between the first hinge connecting part 31 and the first rotating part 33 is 120°, 150°, or the like, and the included angle between the second hinge connecting part 41 and the second rotating part 43 is 120°, 150°, or the like. Alternatively, the terminal product 200 is a mobile phone, the direction of the first body 210 and the direction of the first rotating part 33 are not the same, and the direction of the second body 220 and the direction of the second rotating part 43 are not the same. In another embodiment, when the hinge structure 100 is used in another terminal product 200, the included angle between the first hinge connecting part 31 and the first rotating part 33, and the included angle between the second 5 hinge connecting part 41 and the second rotating part 43 are not limited. During movement of the hinge assembly 100, provided that avoidance space is met, a value of the included angle θ1 and a value of the included angle θ2 may be 90°≤θ1≤180° and 90°≤θ2≤180° respectively. The value of the included angle may be designed based on an actual application scenario and a required angle.

The hinge assembly 100 further includes a first pin 54 and a second pin 55. The first pin 54 is movably connected to the slider 20 and the first swing arm 30. The second pin 55 is movably connected to the slider 20 and the second swing arm 40. Specifically, the first hinge connecting part 31 is provided with a through hole 36, and the first pin 54 successively penetrates a first slide rail 211 of one of the sliders 20, the through hole 36 of the first hinge connecting part 31, and a first slide rail 211 of the other of the sliders 20. The first pin 54, the first base block 11, and the second base block 13 are spaced. The second hinge connecting part 41 is provided with a through hole 46, and the second pin 55 successively penetrates a second slide rail 231 of one of the sliders 20, the through hole 46 of the second hinge connecting part 41, and a second slide rail 231 of the other of the sliders 20. The second pin 55, the first base block 11, and the second base block 13 are spaced.

A size of the first slide rail 211 in the Y-axis direction is greater than a size of the first pin 54 in the Y-axis direction, to enable the first pin 54 to move relative to the slider 20 in the first slide rail 211 in the Y-axis direction. A size of the second slide rail 231 in the Y-axis direction is greater than a size of the second pin 55 in the Y-axis direction, to enable the second pin 55 to move relative to the slider 20 in the second slide rail 231 in the Y-axis direction. The size of the first slide rail 211 in the Z-axis direction is greater than or equal to a size of the first pin 54 in the Z-axis direction, that is, the first fastening part 21 is not in interference fit with the first pin 54 in the Z-axis direction. This enables a frictional resistance force of relative movement between the first pin 54 and the first fastening part 21 to be reduced or prevented when the first pin 54 moves relative to the slider 20 in the first slide rail 211 in the Y-axis direction, to facilitate flexible movement of the first pin 54 relative to the slider 20 in the Y-axis direction. A size of the second slide rail 231 in the Z-axis direction is greater than or equal to a size of the second pin 55 in the Z-axis direction, that is, the second fastening part 23 does not match the second pin 55. This enables a frictional resistance force of relative movement between the second pin 55 and the second fastening part 23 to be reduced or prevented when the second pin 55 moves relative to the slider 20 in the second slide rail 231 in the Y-axis direction, to facilitate flexible movement of the second pin 55 relative to the slider 20 in the Y-axis direction. In this embodiment, both the first slide rail 211 and the second slide rail 231 are waist-shaped holes. In some embodiments, both the first slide rail 211 and the second slide rail 231 may alternatively be arc-shaped holes, that is, the first slide rail 211 and the second slide rail 231 are arc-shaped holes. In another embodiment, a specific shape of the first slide rail 211 and a specific shape of the second slide rail 231 are not limited, as long as the shapes can meet functions of the slide rails.

Linear motion of the two sliders 20 in the Z-axis direction drives synchronous motion of the first pin 54 and the second pin 55. This enables the first swing arm 30 to rotate around the first fastened rod 51, and the second swing arm 40 to rotate around the second fastened rod 52. During rotation, the first swing arm 30 further reacts to the first pin 54 for moving in the Y-axis along the two first slide rails 211. During rotation, the second swing arm 40 further reacts to the second pin 55 for moving in the Y-axis along the two second slide rails 231. That is, when the slider 20 does straight line motion in the Z-axis direction, the first pin 54 does arc motion around the first fastened rod 51, and the second pin 55 does arc motion around the second fastened rod 52. The first swing arm 30 connected to the first pin 54 rotates around the first fastened rod 51 as the first axis. The second swing arm 40 connected to the second pin 55 rotates around the second fastened rod 52 as the second axis. When the first pin 54 does arc motion around the first fastened rod 51 that is fastened and the second pin 55 does arc motion around the second fastened rod 52 that is fastened, relative displacement between the first pin 54 and the second pin 55 occurs.

Refer to FIG. 7 and FIG. 8. FIG. 7 is a schematic diagram of an overall structure of a hinge assembly 100a according to some other embodiments of this application, and FIG. 8 is a schematic cross-sectional view of the hinge assembly 100a shown in FIG. 7 in an A-A direction. The hinge assembly 100a may further include a first elastic member 60a. There may be one or more first elastic members 60a. The first elastic member 60a includes a first elastic part 61 and a second elastic part 63, and the first elastic part 61 is connected to the second elastic part 63. One end, away from the second elastic part 63, of the first elastic part 61 is sleeved on the first pin 54, to be connected to the first hinge connecting part 31. One end, away from the first elastic part 61, of the second elastic part 63 is sleeved on the second pin 55, to be connected to the second hinge connecting part 41. During motion of the first pin 54 and the second pin 55, relative displacement occurs, to drive the first elastic member 60a to deform and generate elastic forces $F_1$ (refer to FIG. 10) in the Y-axis direction, to act on the first pin 54 and the second pin 55 respectively. The elastic forces $F_1$ respectively acting on the first pin 54 and the second pin 55 are equal in magnitude and opposite in direction. The elastic force $F_1$ acting on the first pin 54 is transmitted to the first swing arm 30 connected to the first pin 54, and then acts on the first body 210. The elastic force $F_1$ acting on the second pin 55 is transmitted to the second swing arm 40 connected to the second pin 55, and then acts on the second body 220. Therefore, damping is generated during folding and unfolding of the terminal product 200, and an external force applied by a user during folding and unfolding of the terminal product 200 is added to overcome the damping, increasing use feeling. That is, the first elastic member 60a is disposed, a damping system is applied to rotation of the first swing arm 30 and the second swing arm 40 on the basis that the first swing arm 30 and the second swing arm 40 of the hinge assembly 100a may be rotated synchronously.

In this embodiment, the first elastic member 60a is a torsion spring. The torsion spring includes a first torsion arm 61a (that is, the first elastic part 61), a second torsion arm 63a (that is, the second elastic part 63), and a spiral part 65. The spiral part 65 is located between the first torsion arm 61a and the second torsion arm 63a and connects the first torsion arm 61a and the second torsion arm 63a. The first torsion arm 61a, the spiral part 65, and the second torsion arm 63a are arranged in the Y-axis direction. The first torsion arm 61a and the second torsion arm 63a extend outward from both sides of the spiral part 65 toward directions away from the spiral part 65. The spiral part 65 includes two ring parts 65a. The two ring parts 65a are roughly superimposed on each other in the X-axis direction. The first torsion arm 61a is formed by one ring part 65a extending toward the first pin 54 and being sleeved on the first pin 54. The second torsion arm 63a is formed by the other ring part 65a extending toward the second pin 55 and being sleeved on the second pin 55. The first torsion arm 61a and the second torsion arm 63a are spaced in the X-axis direction. The first torsion arm 61a and the second torsion arm 63a are arranged alternately in the X-axis direction. That is, a projection of the first torsion arm 61a and a projection of the second torsion arm 63a in a direction perpendicular to the X-axis direction do not overlap each other. In another embodiment, a quantity of the ring parts 65a is not limited. When the first elastic member 60a includes the spiral part 65, a bending deformation amount of the first elastic part 61 and a bending deformation amount of the second elastic part 63 may be increased, increasing service life of the first elastic member 60a.

When the first elastic member 60a is the torsion spring, the first torsion arm 61a and the second torsion arm 63a are alternately arranged, and a sleeve 67 may further be sleeved on the first pin 54 and/or the second pin 55. In this embodiment, the sleeves 67 are sleeved on the first pin 54 and the second pin 55 respectively, and the correspondingly disposed sleeves 67 are in contact with the first torsion arm 61a and the second torsion arm 63a respectively. The first torsion arm 61a is clamped between the sleeve 67 and the first hinge connecting part 31, and the second torsion arm 63a is clamped between the second fastening part 23 and the sleeve 67. The sleeves 67 are configured to make up for space generated by mutual dislocation of the first torsion arm 61a and the second torsion arm 63a, and reduce or prevent displacement of the first torsion arm 61a and the second torsion arm 63a in the X-axis direction, enabling the elastic forces $F_1$ generated by deformation of the first elastic member 60a to act on the first pin 54 and the second pin 55 in the Y-axis direction. In some embodiments, the sleeve 67 may be disposed on only one of the first pin 54 or the second pin 55. For example, a length of the first hinge connecting part 31 or the second hinge connecting part 41 in the X-axis direction is extended, to make up for the space generated by the dislocation.

Refer to FIG. 9, FIG. 10, and FIG. 11. To more clearly illustrate a synchronous rotation function of the first swing arm 30 and the second swing arm 40 in the hinge assembly 100a in this implementation, and that the first elastic member 60a provides damping for rotation of the first swing arm 30 and the second swing arm 40, the following describes in detail a folding process of the hinge assembly 100a provided in this implementation. For example, an angle between the first rotating part 33 and the second rotating part 43 is separately 180°, 90°, and 0°. In other embodiments, the angle is not limited thereto.

Refer to FIG. 9. The first rotating part 33 and the second rotating part 43 are on a same plane (that is, the included angle between the first rotating part 33 and the second rotating part 43 is 180°), and the included angle between the first hinge connecting part 31 and the second hinge connecting part 41 is 90°.

Refer to FIG. 10. When the first rotating part 33 and the second rotating part 43 are gradually folded (the included angle between the first rotating part 33 and the second rotating part 43 ranges from 180° to 90°), due to a limitation effect of the first guide groove 171 and the second guide groove 173, the two sliders 20 can move only in the Z-axis direction (that is, the slider 20 cannot rotate in the X-axis direction). The first fastened rod 51 penetrating the first swing arm 30 is fastened to the base 10. When the slider 20 moves in the Z-axis direction, the first hinge connecting part 31 connected to the slider 20 drives the first hinge connecting part 31 to rotate clockwise around the first fastened rod 51, and the first rotating part 33 on the other side of the first fastened rod 51 rotates clockwise around the first fastened rod 51 synchronously. Similarly, the second fastened rod penetrating the second swing arm 40 is fastened to the base 10. When the slider 20 moves in the Z-axis direction, the second hinge connecting part 41 connected to the slider 20 drives the second hinge connecting part 41 to rotate counterclockwise around the second fastened rod 52, and the second rotating part 43 on the other side of the second fastened rod 52 rotates counterclockwise around the second fastened rod 52 synchronously. Because the first hinge connecting part 31 and the second hinge connecting part 41 are connected to a same slider 20, movement of the slider 20 drives the first swing arm 30 and the second swing arm 40 to rotate around respective axes synchronously.

When the included angle between the first rotating part 33 and the second rotating part 43 ranges from 180° to 90°, the first hinge connecting part 31 and the second hinge connecting part 41 are close to each other, the first pin 54 penetrating the first hinge connecting part 31 and the second pin 55 penetrating the second hinge connecting part 41 respectively slide in the first slide rail 211 and the second slide rail 231 in relatively close directions, and the first elastic members 60a sleeved on the first pin 54 and the second pin 55 deform accordingly. In this process, the first elastic members 60a have opposite and equal elastic forces $F_1$ in the Y-axis direction for the first pin 54 and the second pin 55 respectively, and the first elastic members 60a have resistance damping (namely, a repulsive force) for the hinge assembly 100a. When the included angle between the first rotating part 33 and the second rotating part 43 is 90°, the first swing arm 30 and the second swing arm 40 are rotated by 45° respectively. In this case, the first fastened rod 51, the first pin 54, the second pin 55, and the second fastened rod 52 are on a same straight line along a center of a cross section perpendicular to the X-axis direction. A distance between the first pin 54 and the second pin 55 is the shortest, and a deformation of the first elastic member 60a is the largest.

Refer to FIG. 11. When the included angle between the first rotating part 33 and the second rotating part 43 ranges from 90° to 0°, the first hinge connecting part 31 and the second hinge connecting part 41 are away from each other, the first pin 54 and the second pin 55 respectively slide in the first slide rail 211 and the second slide rail 231 in directions that are away from each other, and deformation of the first elastic member 60a is reinstated correspondingly. In this process, the first elastic member 60a has boosting damping (namely, a boosting force) for the hinge assembly 100a. When the included angle between the first rotating part 33 and the second rotating part 43 is 0°, the first swing arm 30 and the second swing arm 40 are further rotated by 45° respectively, and the included angle between the first hinge connecting part 31 and the second hinge connecting part 41 is 90°. In this case, deformation of the first elastic member 60a is reinstated.

It should be noted that the repulsive force or boosting force of the first elastic member 60a on the hinge assembly 100a is related to a relative motion tendency of the first pin 54 and the second pin 55. When a distance between the first pin 54 and the second pin 55 gradually increases, the first elastic member 60a has a repulsive force on the hinge assembly 100a. When the distance between the first pin 54 and the second pin 55 gradually decreases, the first elastic member 60a has a boosting force on the hinge assembly 100a. When the first pin 54 and the second pin 55 move until the first fastened rod 51, the first pin 54, the second pin 55, and the second fastened rod 52 are on a same straight line, the distance between the first pin 54 and the second pin 55 is the smallest. In this case, a deformation amount of the first elastic member 60a is the largest, the elastic forces $F_1$ of the first elastic member 60a acting on the first pin 54 and the second pin 55 is the largest, and damping to the terminal product 200 during folding and unfolding is the largest.

Refer to FIG. 12 and FIG. 13. FIG. 12 is a schematic cross-sectional view of a hinge assembly 100b according to still some other embodiments of this application, and FIG. 13 is a schematic cross-sectional view of FIG. 12 in another orientation. In this embodiment, the first elastic member 60b is a C-shaped spring, and two ends of the C-shaped spring are sleeved on the first pin 54 and the second pin 55 respectively. A principle for generating a damping effect by the C-shaped spring on the hinge assembly 100b is the same as a principle for generating a damping effect by the torsion spring. When the first elastic member 60b is the C-shaped spring, it means that there is no spiral part 65, and no sleeve 67 is to be disposed. Compared with the torsion spring, by using the C-shaped spring, a length of the hinge assembly 100b in the X-axis direction can be reduced, reducing space.

Refer to FIG. 14 and FIG. 15. FIG. 14 is a schematic diagram of an overall structure of a hinge assembly 100c according to yet some embodiments of this application, and FIG. 15 is a schematic cross-sectional view of FIG. 14 in a C-C direction. In this embodiment, a first guide groove 171c in the hinge assembly 100c is further recessed in an X-axis direction. The first guide groove 171c has a convex surface 18. The convex surface 18 protrudes toward an extension part 25, and the convex surface 18 and the extension part 25 are spaced. During movement of the slider 20 in a Z-axis direction, a distance between the extension part 25 and the convex surface 18 changes, and a second elastic member 73 is disposed between the extension part 25 and the convex surface 18. The second elastic member 73 deforms as the distance changes. The second elastic member 73 deforms to generate an elastic force that acts on the slider 20, acts on a first swing arm 30 and a second swing arm 40 that are connected to the slider 20, and further acts on a first body 210 connected to the first swing arm 30, and a second body 220 connected to the second swing arm 40, to implement fine adjustment of damping of the hinge assembly 100c.

Specifically, in this embodiment, the hinge assembly 100c further includes a damping rod 71 and a cam 75. The damping rod 71, the cam 75, and the second elastic member 73 are accommodated in the first guide groove 171c.

The damping rod 71 includes a first limiting part 711, a rod part 713, and a second limiting part 715 arranged in the X-axis direction. The rod part 713 connects the first limiting part 711 and the second limiting part 715, and the rod part 713 is columnar. Both the first limiting part 711 and the second limiting part 715 are block-shaped. The first limiting part 711 is configured to be flexibly connected to the slider 20 and may prevent the damping rod 71 from rotating. The second limiting part 715 is configured to be firmly connected to the cam 75. The rod part 713 penetrates the second elastic member 73.

A surface, away from the first fastening part 21 and the second fastening part 23, of the extension part 25 is provided with an accommodation cavity 27 recessed in the X-axis direction. The accommodation cavity 27 is configured to accommodate the damping rod 71 and limit rotation of the damping rod 71. The accommodation cavity 27 includes a first accommodation part 271 and a second accommodation part 273. A shape of the first accommodation part 271 matches a shape of the first limiting part 711. The first accommodation part 271 is configured to limit the rotation of the damping rod 71. One portion of the rod part 713 is located in the second accommodation part 273, and the other portion of the rod part 713 protrudes from the second accommodation part 273. The second limiting part 715 protrudes from the slider 20, and the damping rod 71 can move in the slider 20 in the X-axis direction. In this embodiment, the accommodation cavity 27 is a through hole. In other embodiments, the accommodation cavity 27 may alternatively be a groove provided that a function of the accommodation cavity can be met.

The cam 75 is firmly connected to the second limiting part 715, the second elastic member 73 is sleeved on the rod part 713, and two ends of the second elastic member 73 respectively abut against the cam 75 and the extension part 25. When the damping rod 71 moves in the slider 20, the second elastic member 73 may be deformed. In this embodiment, the second elastic member 73 is a compression spring. In other embodiments, the second elastic member 73 may alternatively be an elastic element such as a disc spring.

A side, away from the slider 20, of the cam 75 abuts against the convex surface 18 of the first guide groove 171c. When the slider 20 moves in the Z-axis direction, the damping rod 71, the second elastic member 73, and the cam 75 are driven to move in the Z-axis direction, a distance between the convex surface 18 and the extension part 25 changes, and the damping rod 71 moves relative to the slider 20 in the X-axis direction. This enables a distance between the cam 75 abutting against the convex surface 18 and the extension part 25 to change, and further enables the second elastic member 73 to deform.

With reference to FIG. 17, in this embodiment, the convex surface 18 includes a first arc surface 181, a second arc surface 183, and a third arc surface 185 that are successively connected. The first arc surface 181, the second arc surface 183, and the third arc surface 185 are connected smoothly through arc surfaces. The second arc surface 183 protrudes toward the cam 75 relative to the first arc surface 181 and the third arc surface 185. The first arc surface 181 and the third arc surface 185 are symmetrically disposed on two sides of the second arc surface 183. In another embodiment, a shape of the convex surface 18 may be set based on a requirement of damping adjustment.

When the first swing arm 30 and the second swing arm 40 are rotated synchronously, for example, an included angle between the first rotating part 33 and the second rotating part 43 ranges from 180° to 0° (that is, an included angle between the first body 210 and the second body ranges from 180° to 0°), during movement of the cam 75 relative to the convex surface 18, for example, the cam 75 slides from top to bottom, the cam 75 is in contact with the first arc surface 181, the second arc surface 183, and the third arc surface 185 successively. A resistance force $F_2$ received by the cam 75 includes a component force, in the X-axis direction, of a support force $F_n$ that overcomes an elastic force $F_{elastic}$ produced by the second elastic member 73, and a frictional force f that is between the cam 75 and the convex surface 18 and that is opposite to a motion direction. A direction of the resistance force $F_2$ is perpendicular to the Y-axis direction (in an XZ plane), that is, perpendicular to a direction of the elastic force $F_1$ of the first elastic member 60a. By increasing the resistance force $F_2$, damping to the hinge assembly 100 by the elastic force $F_1$ in a single direction may be increased, to implement fine adjustment of the damping to the hinge assembly 100.

When the cam 75 moves relative to the convex surface 18, and when the cam 75 is in contact with the first arc surface 181 and moves toward the second arc surface 183, a distance between the convex surface 18 and the extension part 25 gradually decreases, and the elastic force $F_{elastic}$ gradually increases, and then the component force of the support force $F_n$ in the X-axis direction gradually increases with the gradual increase of the elastic force $F_{elastic}$, the friction force f gradually increases, and the resistance force $F_2$ gradually increases. When the cam 75 is in contact with the second arc surface 183, the distance between the convex surface 18 and the extension part 25 is the smallest, the elastic force $F_{elastic}$ is the largest, the friction force f is the largest, and the resistance force $F_2$ is the largest. When the cam 75 is in contact with the third arc surface 185 and moves toward a direction away from the second arc surface 183, the distance between the convex surface 18 and the extension part 25 gradually decreases, the elastic force $F_{elastic}$ gradually decreases, the elastic force $F_{elastic}$ gradually decreases, the friction force f gradually decreases, and the resistance force $F_2$ gradually decreases.

In another embodiment, a plurality of sets of damping rods 71, cams 75, and second elastic members 73 may be disposed as required. Provided that a requirement for fine adjustment of the damping can be met, by disposing a set of damping rods 71, cams 75, and second elastic members 73, more space for the hinge assembly 100c in the X-axis direction may be reduced. By disposing a plurality of sets of damping rods 71, cams 75, and second elastic members 73, the damping may be adjusted more flexibly. In other embodiments, alternatively, the second guide groove 173 may be recessed in the X-axis direction to accommodate the damping rod 71, the cam 75, and the second elastic member 73, and principles of action in the foregoing embodiments are the same.

FIG. 18 is a schematic cross-sectional view of a hinge assembly 100d according to still yet some other embodiments of this application. Different from the previous embodiment, in this embodiment, a damping rod 71 is stationary relative to a slider 20, that is, the damping rod 71 is firmly connected to the slider 20, a cam 75 is movably connected to the damping rod 71, a first limiting part 711 is firmly connected to the slider 20, and a second limiting part 715 is movably connected to the cam 75. When the slider 20 moves in a Z-axis direction, the damping rod 71, a second elastic member 73, and the cam 75 are driven to move in the Z-axis direction, a distance between a convex surface 18 and an extension part 25 changes, and the cam 75 may move relative to the damping rod 71 in an X-axis direction. This enables a distance between the cam 75 abutting against the convex surface 18 and the extension part 25 to change, and further enables the second elastic member 73 to deform. A principle for generating damping to the hinge assembly 100d is the same as a principle in the foregoing embodiment, and details are not described herein again.

In this embodiment, a manner in which the damping rod 71 is firmly connected to the slider 20 includes but not limited to bonding, clamping, or the like, the damping rod 71 and the slider 20 are an integral structure, or the like. Space in which the damping rod 71 can move relative to the cam 75 is provided on a side, facing the damping rod 71, of the cam 75.

The foregoing implementations are merely intended to describe the technical solutions of this application, but are not intended to limit the technical solutions of this application. Although this application is described in detail with reference to the foregoing example implementations, a person of ordinary skill in the art should understand that modifications or equivalent replacements to the technical solutions of this application should not depart from the spirit and scope of the technical solutions of this application.

What is claimed is:

1. A hinge assembly, comprising:

a base, provided with a guide groove;

a first swing arm, comprising a first hinge connecting part and a first rotating part that are firmly connected, wherein the first hinge connecting part and the first rotating part are rotatable relative to the base around a first axis between the first hinge connecting part and the first rotating part, and the first axis is fastened relative to the base;

a second swing arm, comprising a second hinge connecting part and a second rotating part that are firmly connected, wherein the second hinge connecting part and the second rotating part are rotatable relative to the base around a second axis between the second hinge connecting part and the second rotating part, the second axis is fastened relative to the base, and the second axis is parallel to the first axis; and a slider, comprising a first fastening part, a second fastening part, and an extension part that are firmly connected, wherein the extension part is located in the guide groove, the first fastening part is movably connected to the first hinge connecting part, and the second fastening part is movably connected to the second hinge connecting part; and the first axis and the second axis are parallel to a first direction, and the extension part is movable in the guide groove in a second direction intersecting with the first direction, to drive the first swing arm and the second swing arm to rotate synchronously.

2. The hinge assembly according to claim 1, wherein the first fastening part is provided with a first slide rail, the second fastening part is provided with a second slide rail, the hinge assembly further comprises a first pin and a second pin, the first pin penetrates the first slide rail and the first hinge connecting part, and the second pin penetrates the second slide rail and the second hinge connecting part.

3. The hinge assembly according to claim 2, wherein a size of the first slide rail in a third direction is larger than a size of the first pin in the third direction; and a size of the second slide rail in the third direction is larger than a size of the second pin in the third direction, and the third direction is perpendicular to the first direction and the second direction.

4. The hinge assembly according to claim 1, wherein the hinge assembly further comprises a first elastic member, the first elastic member comprises a first elastic part and a second elastic part connected to each other, one end, away from the second elastic part, of the first elastic part is connected to the first hinge connecting part, and one end, away from the first elastic part, of the second elastic part is connected to the second hinge connecting part.

5. The hinge assembly according to claim 4, wherein the first elastic member is a torsion spring, the torsion spring comprises a spiral part and a first torsion arm and a second torsion arm that are connected to two ends of the spiral part, the first torsion arm is the first elastic part, and the second torsion arm is the second elastic part.

6. The hinge assembly according to claim 5, wherein the hinge assembly further comprises a first pin and a second pin, the first pin penetrates the first fastening part, the first hinge connecting part, and the first torsion arm, and the second pin penetrates the second fastening part, the second hinge connecting part, and the second torsion arm.

7. The hinge assembly according to claim 6, wherein the hinge assembly further comprises a sleeve, at least one of the first pin or the second pin is sleeved with the sleeve, the sleeve is in contact with the first torsion arm and/or the second torsion arm, and the sleeve is configured to prevent the first torsion arm from moving relative to the first pin in the first direction, and/or the second torsion arm from moving relative to the second pin in the first direction.

8. The hinge assembly according to claim 7, wherein the first pin and the second pin are both provided with the sleeves, the first torsion arm is clamped between the sleeve and the first hinge connecting part, and the second torsion arm is clamped between the second fastening part and the sleeve.

9. The hinge assembly according to claim 4, wherein the first elastic member is a C-shaped spring.

10. The hinge assembly according to claim 1, wherein the first direction is perpendicular to the second direction.

11. The hinge assembly according to claim 1, wherein the guide groove comprises a convex surface, and the convex surface protrudes toward the extension part; and the hinge assembly further comprises a second elastic member, the second elastic member is located between the extension part and the convex surface, and when the extension part moves in the second direction, the second elastic member is enabled to deform.

12. The hinge assembly according to claim 11, wherein the hinge assembly further comprises:

a damping rod, wherein the damping rod is movably connected to the slider, and the damping rod is movable relative to the slider in the first direction; and a cam, wherein the cam is firmly connected to the damping rod, and the cam abuts against the convex surface, wherein the second elastic member is sleeved on the damping rod, and two ends of the second elastic member abut against the extension part and the cam respectively.

13. The hinge assembly according to claim 12, wherein the slider comprises an accommodation cavity, the accommodation cavity is formed by recessing in the first direction of a surface, away from the first fastening part and the second fastening part, of the extension part, one portion of the damping rod is located in the accommodation cavity, and the other portion of the damping rod protrudes from the accommodation cavity.

14. The hinge assembly according to claim 13, wherein the accommodation cavity comprises a first accommodation part and a second accommodation part; and the damping rod comprises a first limiting part, a rod part, and a second limiting part, the first limiting part is located in the first accommodation part, a portion of the rod part is located in the second accommodation part, the second elastic member is sleeved on the rod part, and the cam is fastened to the second limiting part.

15. The hinge assembly according to claim 11, wherein the hinge assembly further comprises:

a damping rod, firmly connected to the slider; and a cam, wherein the cam is movably connected to the damping rod, the cam is movable relative to the damping rod in the first direction, and the cam abuts against the convex surface, wherein the second elastic member is sleeved on the damping rod, and two ends of the second elastic member abut against the extension part and the cam respectively.

16. The hinge assembly according to claim 1, wherein the base comprises a first base block, a connecting block, and a second base block, the connecting block connects the first base block and the second base block, and the guide groove is located on the first base block and/or the second base block.

17. The hinge assembly according to claim 16, wherein the hinge assembly further comprises a first fastened rod and a second fastened rod, the first fastened rod is fastened to the first base block and the second base block, the second fastened rod is fastened to the first base block and the second base block, the first fastened rod penetrates a joint between the first hinge connecting part and the first rotating part, and the second fastened rod penetrates a joint between the second hinge connecting part and the second rotating part.

18. The hinge assembly according to claim 16, wherein an included angle between the first hinge connecting part and the first rotating part is greater than or equal to 90° and less than or equal to 180°; and an included angle between the second hinge connecting part and the second rotating part is greater than or equal to 90° and less than or equal to 180°.

19. A terminal product, wherein the terminal product comprises the hinge assembly according to claim 1.

* * * * *